(12) United States Patent
Newman et al.

(10) Patent No.: US 8,816,872 B2
(45) Date of Patent: Aug. 26, 2014

(54) SYSTEM AND METHOD FOR MONITORING, CONTROLLING, AND IMPROVING PRODUCTIVITY AND SAFETY CONDITIONS OF AUTOMATED MACHINERY

(75) Inventors: Richard G. Newman, Burlington, WI (US); Laura J. Morra, Titusville, FL (US); Arland L. Morrison, Port Barrington, IL (US)

(73) Assignee: Signode Industrial Group LLC, Glenview, IL (US)

( * ) Notice: Subject to any disclaimer, the term of this patent is extended or adjusted under 35 U.S.C. 154(b) by 239 days.

(21) Appl. No.: 13/445,481

(22) Filed: Apr. 12, 2012

(65) Prior Publication Data
US 2012/0299727 A1  Nov. 29, 2012

Related U.S. Application Data

(60) Provisional application No. 61/490,746, filed on May 27, 2011.

(51) Int. Cl.
*G08B 21/00* (2006.01)
*G05B 23/02* (2006.01)

(52) U.S. Cl.
CPC .. *G05B 23/0267* (2013.01); *G05B 2219/32007* (2013.01); *G05B 2219/31457* (2013.01); *G05B 2219/35494* (2013.01); *G05B 2219/31449* (2013.01)
USPC ............................ 340/679; 340/540; 340/680

(58) Field of Classification Search
CPC ............ G07C 3/00; F16P 3/14; G08B 21/187
USPC .......................................... 340/540, 679, 680
See application file for complete search history.

(56) References Cited

U.S. PATENT DOCUMENTS

| 4,195,430 | A | * | 4/1980 | Suttles | 40/518 |
| 5,353,315 | A | * | 10/1994 | Scarola et al. | 376/259 |
| 5,656,005 | A | | 8/1997 | Cummings et al. | |

(Continued)

FOREIGN PATENT DOCUMENTS

| WO | WO 2006/076538 A2 | 7/2006 |
| WO | WO 2009/155947 A1 | 12/2009 |

OTHER PUBLICATIONS

BRG Precision Products, ET 200T Timers, Jul. 3, 2010, pp. 1-3, https://web.archive.org/web/20100703131918/http://www.brgprecision.com/products/timers/et100wtimers.php.*

(Continued)

*Primary Examiner* — Kerri McNally
(74) *Attorney, Agent, or Firm* — Neal, Gerber & Eisenberg LLP

(57) ABSTRACT

Systems and methods are disclosed for monitoring the productivity, operability, and safety conditions of factory machinery and particularly unitizers. The system monitors factory machines such as a unitizer in a corrugated box factory, using one or more sensors to determine whether and how efficiently the machinery is operating, to determine if any conditions of the machinery require immediate attention, and to determine if a safety violation has occurred with respect to the machinery. The system appropriately notifies a factory manager of issues that arise. In addition, the system aggregates data about past performance and safety violations and generates reports about the aggregated data to help factory managers maximize productivity of the monitored machinery. The disclosed system is particularly advantageous in that it enables improvement of the productivity of the factory as a whole.

30 Claims, 25 Drawing Sheets

(56) References Cited

U.S. PATENT DOCUMENTS

| | | | | |
|---|---|---|---|---|
| 5,777,896 | A | * | 7/1998 | Arita et al. .................... 702/185 |
| 6,633,782 | B1 | * | 10/2003 | Schleiss et al. ................. 700/26 |
| 2004/0237806 | A1 | * | 12/2004 | Sickels ........................... 100/26 |
| 2010/0125361 | A1 | * | 5/2010 | Mougin et al. ................. 700/217 |
| 2012/0146789 | A1 | * | 6/2012 | De Luca et al. ............... 340/540 |

OTHER PUBLICATIONS

International Search Report and Written Opinion of the International Searching Authority for corresponding PCT Application No. PCT/US2012/039653, dated Nov. 8, 2012 (16 pages).

"Kiwiplan—Providing the Total Solution," Brochure, dated 2008 (16 pages).

"Kiwiplan—The Total Solution," Brochure (4 pages).

Systec Conveyors, Description and Specifications of Visual Absolute Positioning System (VAPS), available at http://systecconveyors.com/systec/Portals/0/systecimgs/product/vaps/VAPS%2010.pdf, printed Jan. 9, 2013 (2 pages).

Signode—Protective Packaging Solutions, "Power Strapping Machines," available at http://www.signode.com/na/industry_solutions/beverage/bev_pss_machine.htm, printed Jan. 8, 2013 (3 pages).

Systec Conveyors, Presentation of VAPS—Systec OEM Strapper Positioning Software, dated Nov. 4, 2010 (22 pages).

* cited by examiner

Performance Report for Unitizer 1
For the period: 02/01/2010 07:00  02/28/2010 7:00

FIG. 7  Corrugator Plant  3/1/2010 10:01 AM  ~700

| | Available Time | Idle Time | Downtime | Units Attempted | Avg Unit Cycle Time(secs) | Efficiency | Loads Strapped/Hr | Utilized Time | %Auto | %Manual | Safety Concerns | Sealer Efficiency | Area (MSF) | Strap Utilized (MLF) |
|---|---|---|---|---|---|---|---|---|---|---|---|---|---|---|
| 02/01/2010 | 24:00 | 11:25 | 01:15 | 2000 | 21 | 86% | 83 | 11:20 | 84% | 16% | 2 | 83% | 5400 | 7.3 |
| -Shift 1 | 8:00 | 3:10 | 01:00 | 700 | 20 | 88% | 88 | 3:50 | 80% | 20% | 2 | 80% | 1800 | 2.3 |
| -Shift 2 | 8:00 | 3:45 | 00:15 | 800 | 18 | 90% | 100 | 4:00 | 81% | 19% | 0 | 90% | 2100 | 3.0 |
| -Shift 3 | 8:00 | 4:30 | 00:00 | 500 | 25 | 80% | 83 | 3:30 | 90% | 10% | 0 | 80% | 1500 | 2.0 |
| WTD | | | | | | | | | | | | | | |
| 02/22/2010 | 144:00 | ### | ### | ### | ### | ### | ### | ### | ### | ### | ### | ### | ### | ### |
| -Shift 1 | 48:00 | ### | ### | ### | ### | ### | ### | ### | ### | ### | ### | ### | ### | ### |
| -Shift 2 | 48:00 | ### | ### | ### | ### | ### | ### | ### | ### | ### | ### | ### | ### | ### |
| -Shift 3 | 48:00 | ### | ### | ### | ### | ### | ### | ### | ### | ### | ### | ### | ### | ### |
| MTD | | | | | | | | | | | | | | |
| 02/01/2010 | 576:00 | ### | ### | ### | ### | ### | ### | ### | ### | ### | ### | ### | ### | ### |
| -Shift 1 | 192:00 | ### | ### | ### | ### | ### | ### | ### | ### | ### | ### | ### | ### | ### |
| -Shift 2 | 192:00 | ### | ### | ### | ### | ### | ### | ### | ### | ### | ### | ### | ### | ### |
| -Shift 3 | 192:00 | ### | ### | ### | ### | ### | ### | ### | ### | ### | ### | ### | ### | ### |
| YTD | 1176:00 | | | | | | | | | | | | | |
| 01/01/2010 | 0 | ### | ### | ### | ### | ### | ### | ### | ### | ### | ### | ### | ### | ### |
| -Shift 1 | 392:00 | ### | ### | ### | ### | ### | ### | ### | ### | ### | ### | ### | ### | ### |
| -Shift 2 | 392:00 | ### | ### | ### | ### | ### | ### | ### | ### | ### | ### | ### | ### | ### |
| -Shift 3 | 392:00 | ### | ### | ### | ### | ### | ### | ### | ### | ### | ### | ### | ### | ### |

FIG. 8

Unit Details Report for Unitizer 1  
For the period: 02/01/2010 07:00 - 02/28/2010 7:00    Corrugator Plant    3/1/2010 10:01 AM

/— 800

| Unit ID | Unit Cycle Start | Unit Cycle Stop | Unit Cycle Time | Number of Strokes | Strap Lineal | Auto or Manual |
|---|---|---|---|---|---|---|
| 21 | | | 00:00:29 | 22 | ##### | 86% |
| 2/02/2010 09:30:00 | 09:30:00 | 09:30:20 | 00:00:20 | 1 | #### | A |
| 2/02/2010 10:01:00 | 10:01:00 | 10:01:17 | 00:00:17 | 1 | #### | A |
| 2/05/2010 14:00:00 | 14:00:00 | 14:00:50 | 00:00:50 | 1 | #### | M |
| 2/08/2010 11:29:00 | 11:29:00 | 11:29:49 | 00:00:20 | 1 | #### | A |
| 2/10/2010 12:05:00 | 12:05:00 | 12:05:15 | 00:00:15 | 1 | #### | A |
| 2/11/2010 12:00:00 | 12:00:00 | 12:01:00 | 00:01:00 | 2 | #### | A |
| 2/12/2010 12:02:25 | 12:02:25 | 12:02:45 | 00:00:20 | 1 | #### | A |
| 2/13/2010 12:03:00 | 12:03:00 | 12:05:00 | 00:02:00 | 1 | #### | M |
| 2/14/2010 17:50:00 | 17:50:00 | 17:50:30 | 00:00:30 | 1 | #### | A |
| 2/15/2010 10:01:00 | 10:01:00 | 10:01:17 | 00:00:17 | 1 | #### | A |
| 2/15/2010 14:00:00 | 14:00:00 | 14:00:50 | 00:00:50 | 1 | #### | M |
| 2/16/2010 11:29:00 | 11:29:00 | 11:29:49 | 00:00:20 | 1 | #### | A |
| 2/16/2010 13:00:00 | 13:00:00 | 13:00:19 | 00:00:19 | 1 | #### | A |
| 2/17/2010 06:30:00 | 06:30:00 | 06:30:20 | 00:00:20 | 1 | #### | A |
| 2/17/2010 09:10:00 | 09:10:00 | 09:10:30 | 00:00:20 | 1 | #### | A |
| 2/17/2010 22:10:00 | 22:10:00 | 22:10:20 | 00:00:20 | 1 | #### | A |
| 2/20/2010 22:10:00 | 22:10:00 | 22:10:20 | 00:00:20 | 1 | #### | A |
| 2/20/2010 13:00:00 | 13:00:00 | 13:00:19 | 00:00:19 | 1 | #### | A |
| 2/25/2010 06:30:00 | 06:30:00 | 06:30:20 | 00:00:20 | 1 | #### | A |
| 2/27/2010 09:10:00 | 09:10:00 | 09:10:30 | 00:00:20 | 1 | #### | A |
| 2/28/2010 07:00:00 | 07:00:00 | 07:00:20 | 00:00:20 | 1 | #### | A |

FIG. 10

Task Activity Report for Unitizer 1      Corrugator Plant      3/1/2010 10:01 AM
For the period:  02/28/2010 07:00 - 02/28/2010 15:00

1000

| TASK | Task Type | Task Due | Task Complete | Status |
|---|---|---|---|---|
| -Blow out Sealers | Operator | 02/28/2010 14:00 | 02/28/2010 14:30 | Complete |
| -Blow out Feeder Modules | Operator | 02/28/2010 14:00 | 02/28/2010 14:50 | Complete |
| -Ensure conveyor bed is clean | Operator | 02/28/2010 14:00 | | Overdue |
| -Blow Out Dispensers | Operator | 02/28/2010 14:00 | 02/28/2010 14:59 | Dismissed |
| -Ensure photo eyes are aimed at their corresponding reflector | Maintenance | 02/28/2010 13:00 | 02/28/2010 13:26 | Complete |
| -Check and replace missing or hanging gates | Maintenance | 02/28/2010 14:00 | | Overdue |
| 20,000 Cycles | | | | |
| -Clean and re-lube flat cage bearings [Accrolube] | Maintenance | 02/28/2010 09:16 | 02/28/2010 09:42 | Complete |
| -Clean and lube moving segments [Accrolube] | Maintenance | 02/28/2010 09:16 | 02/28/2010 10:00 | Complete |
| -Inspect and replace if required weld motor/index motor brushes | Maintenance | 02/28/2010 09:16 | 02/28/2010 10:13 | Complete |
| -Check strap for clean cutoff and weld for proper coverage and alignment | Maintenance | 02/28/2010 09:16 | | Overdue |
| -Check spring loaded strap wiper for excessive wear | Maintenance | 02/28/2010 09:16 | | Overdue |

FIG. 11

BOX COMPANY -- MIDTOWN, STATE
Unitizer 1 --
02/14/2010 14:59
ACQ  MES
Current Shift Average 88
Last 24 Hour Average 91
Shift Record 163
04/15/10 -- 1st Shift SAFETY FIRST
Last Safety Infraction occurred
100 Days
AVOID ACCIDENTS Loads per Hour
Automatic Email  Preferences  Home  Reports  Unitizer

| Unitizer 1 | Shift | Day | WTD | MTD | YTD |
|---|---|---|---|---|---|
| Available Time | 7:59 | 24:00 | 120:00 | 480:00 | 480:00 |
| Idle Time | 3:09 | 12:09 | 73:30 | 304:30 | 304:30 |
| Downtime | 1:00 | 3:30 | 3:30 | 3:30 | 3:30 |
| Units Attempted | 700 | 2,000 | 8,000 | 32,000 | 32,000 |
| Avg Unitizer Cycle Time | 33 | 30 | 30 | 30 | 30 |
| Avg Unit Discharge Time | 35 | 34 | 34 | 34 | 34 |
| Loads Strapped/ Hr | 88 | 83 | 83 | 83 | 83 |
| Utilized Time | 3:50 | 8:21 | 43:00 | 172:00 | 172:00 |
| %Auto | 80 | 85 | 85 | 86 | 86 |
| %Manual | 20 | 15 | 16 | 16 | 16 |
| Efficiency | 87% | 85% | 97% | 99% | 99% |
| Safety Concerns | 2 | 3 | 4 | 4 | 4 |
| Sealer Efficiency | 80 | 81 | 80 | 80 | 80 |
| Strap Utilized (MLF) | 2.3 | 6.9 | 34.5 | 138 | 138 |

BOX COMPANY --MIDTOWN, STATE
Unitizer 1 --
02/14/2010 14:59
ACQ  MES
Current Shift Average  88
Last 24 Hour Average  91
Shift Record  163
04/15/10  --  1st Shift Loads per Hour
Automatic SAFETY FIRST
Last Safety Infraction occurred
100 Days
AVOID ACCIDENTS

1300

Email  Preferences  Home  Reports  Unitizer

○ Day  ○ WTD  ○ MTD  ○ YTD

| DATE TIME | Description | | | | | |
|---|---|---|---|---|---|---|
| 2/10/10 2:23 PM | Violation of lock out/tag out rules. | | | | | |
| 2/20/10 5:54 PM | | | | | | |

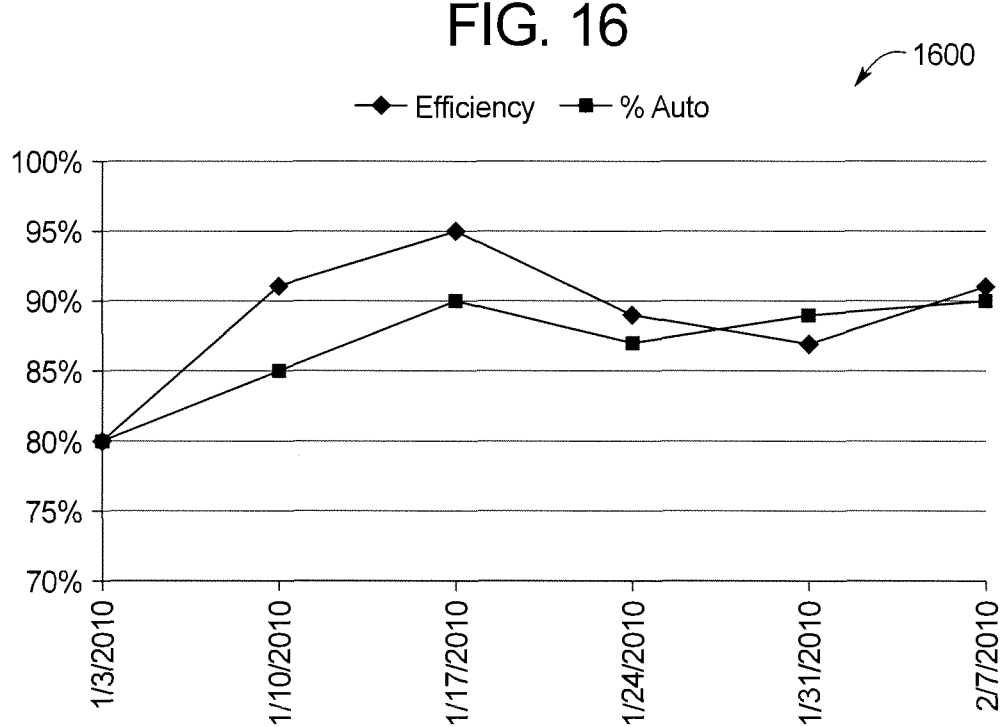
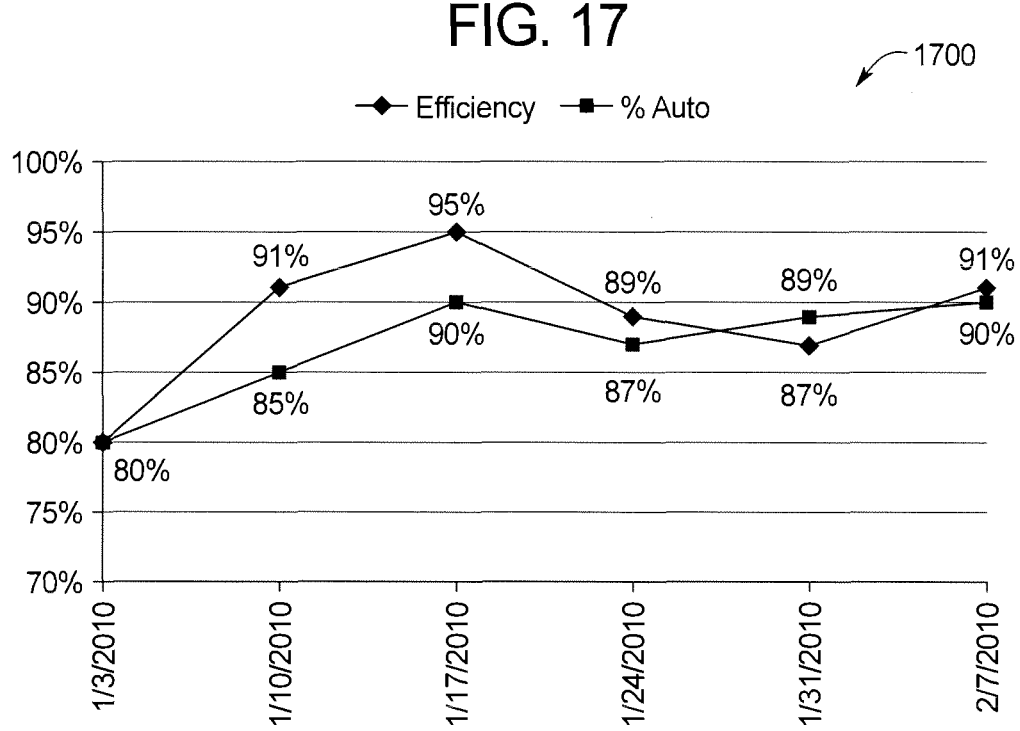

FIG. 19A

| Group | Category | Address | Address | Data Type | Value | Description | Possible Symptom | Cause and/or Corrective action | Urgency |
|---|---|---|---|---|---|---|---|---|---|
| PSM1 | Fault | M20.4 | | Bit | 1 | PSM1 head fault | NA | Clear by pushing flashing PSM button. | 1 |
| PSM1 | Fault | V2.0 | | Bit | 1 | PSM1 feeder door open during cycle | Feeder door left open after clearing strap. Switch not activated by key in door. | Close door. Align key to activate switch. Defective switch. | 1 |
| PSM1 | Fault | V6.1 | | Bit | 1 | PSM1 weld count did not exceed minimum value | Weld Motor rotation did not occur. Weld count prox did not read change of state. | Circuit Breaker tripped. Brushes not making correct action with armature. | 1 |
| PSM1 | Fault | V8.4 | C35 | Bit | 1 | PSM1 takeup error | Strap was snagged during take up on a feed fault. | Push flashing PSM button to cut off snagged strap and hit solid lit PSM 1 button to finish strap cycle. | 1 |
| PSM1 | Fault | V8.5 | C43 | Bit | 1 | PSM1 index error | Sealer index action was not read by prox or sealer did not rotate. | Prox defective or distance to target cam was incorrect. Circuit Breaker tripped. Relay defective. | 1 |
| PSM1 | Fault | V10.6 | C41 | Bit | 1 | PSM1 takeup timed out passed infeed prox | Strap triggered Feed limit switch but was not gripped by end grip during take up. | Blow out sealer head to remove debris. Investigate both drag from dispenser and strap feeding resistance. | |
| PSM1 | Fault | C 0 and T 103 | | Integer | C 0=3 and T 103=70 | PSM1 refeed fault counter | NA | NA | 1 |
| PSM1 | Fault | T 120 | | Integer | 30 | PSM1 feeding timed out not passed infeed prox | Infeed prox did not change state when strap was present. Strap did not feed properly on a load or reload. | Infeed prox defective. Feeder handle left with the wheels in an open position. Feeder door not fully closed. Obstruction in the feeder tube path. | 1 |

FIG. 19B

| Group | Category | Address | Address Data Type | Value | Description | Possible Symptom | Cause and/or Corrective action | Urgency |
|---|---|---|---|---|---|---|---|---|
| PSM2 | Fault | M23.4 | Bit | 1 | PSM2 head fault | NA | Clear by pushing flashing PSM button. | 1 |
| PSM2 | Fault | V12.0 | Bit | 1 | PSM2 feeder door open during cycle | Feeder door left open after clearing strap. Switch not activated by key in door. | Close door. Align key to activate switch. Defective switch. | 1 |
| PSM2 | Fault | V16.1 | Bit | 1 | PSM2 weld count did not exceed minimum value | Weld Motor rotation did not occur. Weld count prox did not read change of state. | Circuit Breaker tripped. Brushes not making correct action with armature. | 1 |
| PSM2 | Fault | V18.4 | Bit | 1 | PSM2 takeup error | Strap was snagged during take up on a feed fault. | Push flashing PSM button to cut off snagged strap and hit solid lit PSM 1 button to finish strap cycle. | 1 |
| PSM2 | Fault | V18.5 | Bit | 1 | PSM2 index error | Sealer index action was not read by prox or sealer did not rotate. | Prox defective or distance to target cam was incorrect. Circuit Breaker tripped. Relay defective. | 1 |
| PSM2 | Fault | V20.6 | Bit | 1 | PSM2 takeup timed out passed infeed prox | Strap triggered Feed limit switch but was not gripped by end grip during take up. | Blow out sealer head to remove debris. Investigate both drag from dispenser and strap feeding resistance. | 1 |
| PSM2 | Fault | C 1 and T 123 | Integer | C 1=3 and T 123=70 | PSM2 refeed fault counter | NA | NA | |
| PSM2 | Fault | T 140 | Integer | 30 | PSM2 feeding timed out not passed infeed prox | Infeed prox did not change state when strap was present. Strap did not feed properly on a load or reload. | Infeed prox defective. Feeder handle left with the wheels in an open position. Feeder door not fully closed. Obstruction in the feeder tube path. | 1 |

FIG. 19C

| Group | Category | Address | Address | Data Type | Value | Description | Possible Symptom | Cause and/or Corrective action | Urgency |
|---|---|---|---|---|---|---|---|---|---|
| PSM3 | Fault | M26.4 | | Bit | 1 | PSM3 head fault | NA | Clear by pushing flashing PSM button. | 1 |
| PSM3 | Fault | V22.0 | | Bit | 1 | PSM3 feeder door open during cycle | Feeder door left open after clearing strap. Switch not activated by key in door. | Close door. Align key to activate switch. Defective switch. | 1 |
| PSM3 | Fault | V26.1 | | Bit | 1 | PSM3 weld count did not exceed minimum value | Weld Motor rotation did not occur. Weld count prox did not read change of state. | Circuit Breaker tripped. Brushes not making correct action with armature. | 1 |
| PSM3 | Fault | V28.4 | | Bit | 1 | PSM3 takeup error | Strap was snagged during take up on a feed fault. | Push flashing PSM button to cut off snagged strap and hit solid lit PSM 1 button to finish strap cycle. | 1 |
| PSM3 | Fault | V28.5 | | Bit | 1 | PSM3 index error | Sealer index action was not read by prox or sealer did not rotate. | Prox defective or distance to target cam was incorrect. Circuit Breaker tripped. Relay defective. | 1 |
| PSM3 | Fault | V30.6 | | Bit | 1 | PSM3 takeup timed out passed infeed prox | Strap triggered Feed limit switch but was not gripped by end grip during take up. | Blow out sealer head to remove debris. Investigate both drag from dispenser and strap feeding resistance. | 1 |
| PSM3 | Fault | C 2 and T 143 | | Integer | C 2=3 and T 143=70 | PSM3 refeed fault counter | NA | NA | |
| PSM3 | Fault | T 160 | | Integer | 30 | PSM3 feeding timed out not passed infeed prox | Infeed prox did not change state when strap was present. Strap did not feed properly on a load or reload. | Infeed prox defective. Feeder handle left with the wheels in an open position. Feeder door not fully closed. Obstruction in the feeder tube path. | 1 |

FIG. 19D

| Group | Category | Address | Address | Data Type | Value | Description | Possible Symptom | Cause and/or Corrective action | Urgency |
|---|---|---|---|---|---|---|---|---|---|
| PSM4 | Fault | M28.4 | | Bit | 1 | PSM4 head fault | NA | Clear by pushing flashing PSM button. | 1 |
| PSM4 | Fault | V32.0 | | Bit | 1 | PSM4 feeder door open during cycle | Feeder door left open after clearing strap. Switch not activated by key in door. | Close door. Align key to activate switch. Defective switch. | 1 |
| PSM4 | Fault | V36.1 | | Bit | 1 | PSM4 weld count did not exceed minimum value | Weld Motor rotation did not occur. Weld count prox did not read change of state. | Circuit Breaker tripped. Brushes not making correct action with armature. | 1 |
| PSM4 | Fault | V38.4 | | Bit | 1 | PSM4 takeup error | Strap was snagged during take up on a feed fault. | Push flashing PSM button to cut off snagged strap and hit solid lit PSM 1 button to finish strap cycle. | 1 |
| PSM4 | Fault | V38.5 | | Bit | 1 | PSM4 index error | Sealer index action was not read by prox or sealer did not rotate. | Prox defective or distance to target cam was incorrect. Circuit Breaker tripped. Relay defective. | 1 |
| PSM4 | Fault | V55.0 | | Bit | 1 | PSM4 takeup timed out passed infeed prox | Strap triggered Feed limit switch but was not gripped by end grip during take up. | Blow out sealer head to remove debris. Investigate both drag from dispenser and strap feeding resistance. | 1 |
| PSM4 | Fault | C 19 and T 163 | | Integer | C 19=3 and T 163=70 | PSM4 refeed fault counter | NA | NA | |
| PSM4 | Fault | T 161 | | Integer | 30 | PSM4 feeding timed out not passed infeed prox | Infeed prox did not change state when strap was present. Strap did not feed properly on a load or reload. | Infeed prox defective. Feeder handle left with the wheels in an open position. Feeder door not fully closed. Obstruction in the feeder tube path. | |

FIG. 19E

| Group | Category | Address | Address | Data Type | Value | Description | Possible Symptom | Cause and/or Corrective action | Urgency |
|---|---|---|---|---|---|---|---|---|---|
| PSM1 | Status | M12.1 | C 13 | Bit | 1 | PSM1 strap cycle request | | | |
| PSM1 | Status | V4.5 | | Bit | 1 | PSM1 strap cycle attempt | | | |
| PSM1 | Status | V5.4 | | Bit | 1 | PSM1 strap cycle complete | | | |
| PSM1 | Status | C0 | | Integer | 0 thru 3 | PSM1 strap refeed attempt | | | |
| | | | | | | | | | |
| PSM2 | Status | M12.6 | | Bit | 1 | PSM2 strap cycle request | | | |
| PSM2 | Status | V14.5 | | Bit | 1 | PSM2 strap cycle attempt | | | |
| PSM2 | Status | V15.4 | | Bit | 1 | PSM2 strap cycle complete | | | |
| PSM2 | Status | C1 | | Integer | 0 thru 3 | PSM2 strap refeed attempt | | | |
| | | | | | | | | | |
| PSM3 | Status | M13.3 | | Bit | 1 | PSM3 strap cycle request | | | |
| PSM3 | Status | V24.5 | | Bit | 1 | PSM3 strap cycle attempt | | | |
| PSM3 | Status | V25.4 | | Bit | 1 | PSM3 strap cycle complete | | | |
| PSM3 | Status | C2 | | Integer | 0 thru 3 | PSM3 strap refeed attempt | | | |
| | | | | | | | | | |
| PSM4 | Status | M13.6 | | Bit | 1 | PSM4 strap cycle request | | | |
| PSM4 | Status | V34.5 | | Bit | 1 | PSM4 strap cycle attempt | | | |
| PSM4 | Status | V35.4 | | Bit | 1 | PSM4 strap cycle complete | | | |
| PSM4 | Status | C 19 | | Integer | 0 thru 3 | PSM4 strap refeed attempt | | | |
| | | | | | | | | | |
| Platen | Status | M11.3 | | Bit | 1 | Start Platen down | | | |
| Platen | Status | M11.4 | | Bit | 1 | Stop Platen | | | |
| Platen | Status | M1.7 | | Bit | 1 | Platen compression level reached | | | |

FIG. 19F

| Group | Category | Address | Data Type | Value | Description | Possible Symptom | Cause and/or Corrective action | Urgency |
|---|---|---|---|---|---|---|---|---|
| Platen | Status | VW 106 | Integer | 13,500 to 19,000 | Platen compression level setpoint | | | |
| Platen | Fault | M0.6 | Bit | 1 | Platen load edge eyes blocked before platen contact | Dunnage blocked eye. Exiting bundle has not fully left. Eye not seeing reflector. | Fold dunnage or realign. Move exiting bundle further downstream. Align eye with reflector. Defective eye. | 1 |
| Platen | Fault | T 201 | Integer | 6 | Braking relays did not engage properly | Sequential lights flashing for PSM buttons. | Frequency drive relay did not activate. Watching relays did not change state in correct amount of time. | 1 |
| Platen | Fault | T 202 | Integer | 6 | Braking relays did not engage properly | Sequential lights flashing for PSM buttons. | Frequency drive relay did not activate. Watching relays did not change state in correct amount of time. | 1 |
| Turntable | Status | M3.0 | Bit | 1 | Turntable cycle in progress | | | |
| Turntable | Fault | M4.6 | Bit | 1 | Turntable fault | | | 1 |
| Turntable | | | | | | | | |
| Turntable | | | | | | | | |

FIG. 19G

| Group | Category | Address | Address | Data Type | Value | Description | Possible Symptom | Cause and/or Corrective action | Urgency |
|---|---|---|---|---|---|---|---|---|---|
| PVF A1 | Fault | V51.3 | | Bit | 1 | PVF A1 fault | | | |
| PVF A1 | | | | | | | | | |
| PVF A1 | | | | | | | | | |
| PVF A2 | Fault | V52.3 | | Bit | 1 | PVF A2 fault | | | |
| PVF A2 | | | | | | | | | |
| PVF A2 | | | | | | | | | |
| PVF A3 | Fault | V53.3 | | Bit | 1 | PVF A3 fault | | | |
| PVF A3 | | | | | | | | | |
| PVF A3 | | | | | | | | | |
| PVF A4 | Fault | V54.3 | | Bit | 1 | PVF A4 fault | | | |
| PVF A4 | | | | | | | | | |
| PVF A4 | | | | | | | | | |
| Machine | Status | M11.7 | | Bit | 1 | Machine in hom after strapping load | | | |
| Machine | | | | | | | | | |
| Machine | | | | | | | | | |

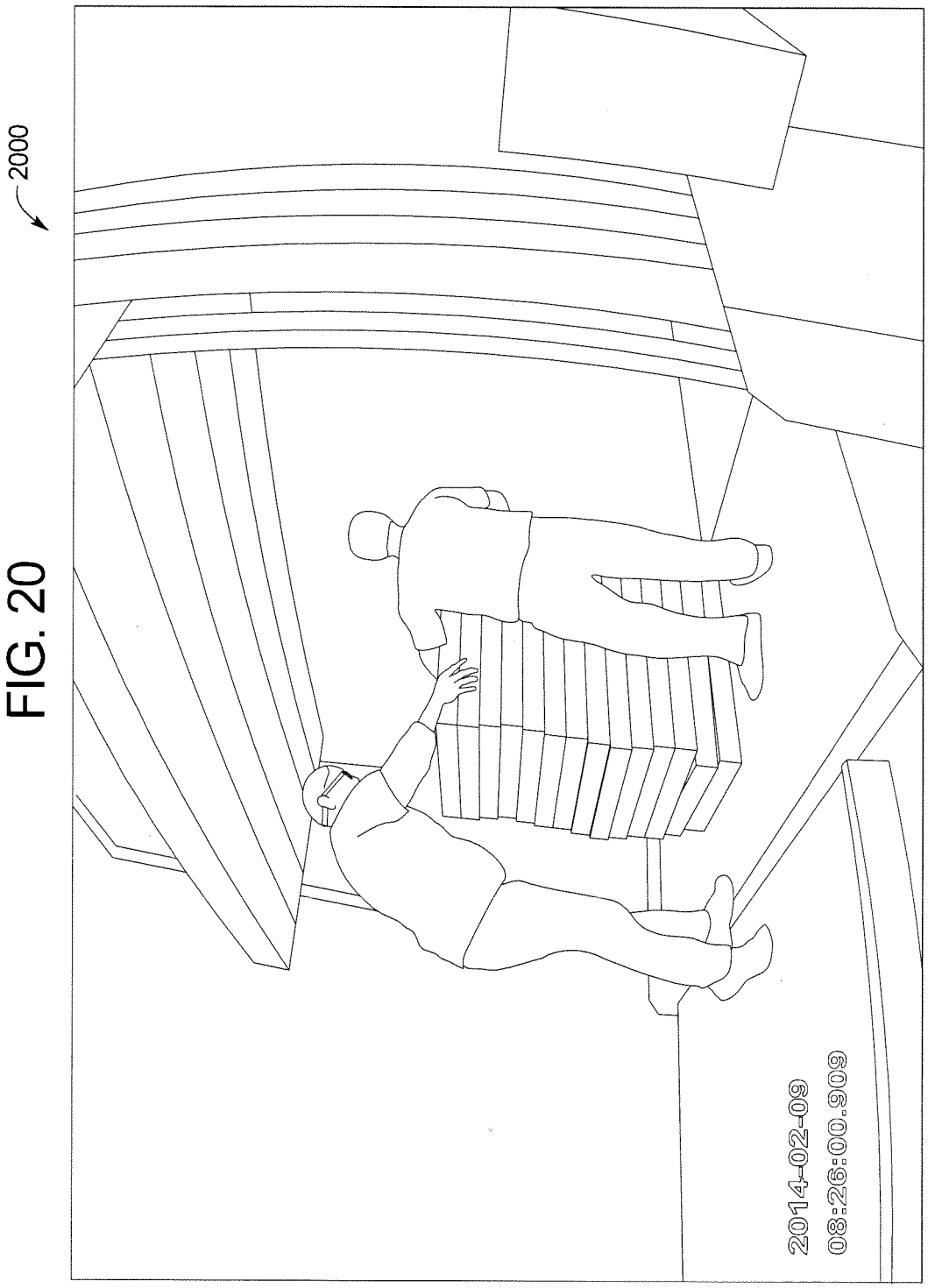

SYSTEM AND METHOD FOR MONITORING, CONTROLLING, AND IMPROVING PRODUCTIVITY AND SAFETY CONDITIONS OF AUTOMATED MACHINERY

PRIORITY CLAIM

This application is a non-provisional application of, and claims priority to and the benefit of U.S. Provisional Patent Application No. 61/490,746, filed May 27, 2011, the entire contents of which are incorporated herein by reference.

COPYRIGHT NOTICE

A portion of the disclosure of this patent document contains material that is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

TECHNICAL FIELD

The present disclosure relates in general to a system and method for monitoring, controlling, and improving productivity and safety conditions of automated machinery. More specifically, the present disclosure relates to a system and method for monitoring, controlling, and improving productivity and safety of one or more pieces of unitizing equipment, such as one or more unitizers, in a product manufacturing factory.

BACKGROUND

Factory managers typically wish to quickly, efficiently, and safely transport raw and manufactured materials through various machinery to create products to be sold, and to eventually package those products in a convenient form for shipping to customers. For example, in a corrugated manufacturing factory, boxes are manufactured by first creating corrugated material in a machine called a corrugator. The corrugated materially is sequentially delivered to a series of machines that each performs one or more steps in the manufacture of corrugated boxes. These machines include, for example: gluing machines, creasing machines, and folding machines. The corrugated boxes in their various states of completion are typically delivered to and transported from each of these machines using a conveyer system which interconnects the machines.

After manufacture of the corrugated products, the factory manager is faced with the problem of packaging or strapping the manufactured products together in a convenient, unitary form for shipment to customers such as distributors or end users. For this, various types of unitizing equipment, including relatively large machines called unitizers, are frequently employed to aid in the unitization or packaging of the manufactured products for relatively easy shipping, storage, and other handling. Such unitizers apply one or more straps around a group or bail of products to be secured such that the secured products can be easily and safely transported.

More specifically, in certain circumstances, where the products to be secured are compressible (such as when the products are corrugated boxes), unitizers perform a variety of tasks. Certain unitizers compress such products to be secured and apply one or more straps or other securing devices around the compressed products. Certain unitizers compress and partially secure the products in one direction, rotate the partially secured products, and compress and secure the products in another direction. It should be appreciated that other unitizers perform other tasks depending on the products to be unitized.

As with other machines in the manufacturing line, the products are typically delivered to and transported out of conventional unitizers by conventional transport mechanisms such as conveyer systems, including conveyer belts or rollers. These transport mechanisms transport the products along the manufacturing line and eventually transport an unsecured group or bail of products into the unitizer for strapping. The transport mechanisms typically also transport the unitized or strapped products out of the unitizer for delivery to a shipping area.

Unitizers, which can be used in a variety of industries, present factory managers with a variety of problems.

Due to the size of and forces applied by unitizers to the products to be packaged, unitizers can present a safety risk to the people who operate them. For example, if a bail of corrugated boxes becomes skewed and needs to be re-adjusted or squared, an operator may seek to remedy the situation by approaching the unitizer. This action may constitute a safety violation, particularly if the unitizers platen is not latched. Therefore, factory or plant managers typically desire to prevent such potentially unsafe behavior in relation to unitizers.

It has also been found that, although unitizers can be characterized as post-production machines, they play a central role in the productivity of a manufacturing factory. That is, productivity bottlenecks in a unitizer can severely restrict overall factory productivity. Therefore, factory or plant managers typically desire to maximize the operation of unitizers and increase throughput.

Since unitizers are typically at or near the end of a factory's manufacturing assembly line, and do not usually perform a role in the actual manufacture of the products of made in the factory, unitizers have typically been employed as separate machines rather than employed as an integral part of the rest of the machinery in the factory. Since the unitizers are employed separately, the control and monitoring of the unitizers have been separate. In other words, the control and monitoring of unitizers have not been integrated with the control and monitoring of the machinery that makes the products. It is thus typically difficult for the factory or plant manager to ascertain the nature of malfunctions with or within a unitizer since the unitizer (as a practically separate machine from the rest of the machinery in the factory) does not have integrated monitoring systems for reporting its status. Thus, conventional unitizers often require intervention by factory management to both ascertain the nature of a malfunction and to determine how to remedy the malfunction of a unitizer.

One known solution for addressing these problems with unitizers in factories (e.g., safety violations occurring at or near the unitizer and problems with the unitizer itself) includes a camera trained on the unitizer that provides and records a live video stream of the operation of the unitizer. This system suffers from the substantial drawback that to be useful, at least one individual must continuously monitor the camera feed for potential functional and safety issues with the unitizer during the operation of the unitizer. Even if that individual happens to be watching the video stream when a safety infraction or functional issue with the unitizer occurs, the individual must first detect the safety infraction or functional issue, and then must take further measures to inform the appropriate person(s) in management of the problem. Additionally, this system is not integrated with other factory monitoring and control systems and thus does not solve all of the above problems such as the potential bottleneck issues created by unitizers.

The overall importance of unitizers in factory productivity has also not been adequately addressed by known systems configured to improve factory productivity. Available systems for manufacturing plants or factories that employ unitizing equipment, such as unitizers, typically focus on monitoring the machines involved in the actual creation or manufacture of the products rather than in the unitizing of manufactured products after they have been made. Known systems do not facilitate improvement of the throughput of unitizers (or other similar machinery), in part because they do not provide adequate monitoring and control of such machinery, despite the fact that most or all of the manufactured products output by a factory pass through the unitizer.

Accordingly, there is a need for a system to facilitate enhanced control of and safety monitoring and productivity improvement in unitizers (and other similar machines) in manufacturing factories. A need also exists for a system that monitors the unitizer and provides feedback about weaknesses associated with the unitizer, such as possible safety infractions and other possible machinery issues. A further need exists for a system that integrates data captured from various points in a factory, including unitizers (and other similar machinery) in the factory, and makes that integrated data available for easy consumption, reaction, and adjustment by factory managers and other factory personnel.

SUMMARY OF THE DISCLOSURE

The system and method disclosed herein address the problems of the known systems described above by enabling tight control and monitoring of unitizing equipment, including unitizers, in a manufacturing factory or plant. In one embodiment, the disclosed system includes a computer connected to at least one unitizer that enables a manager, remote from the unitizer, to monitor whether the monitored unitizer(s) are operating properly, whether the monitored unitizer(s) are operating at maximum or near maximum efficiency, and whether the users of the monitored unitizer(s) are operating the machine in a safe and compliant way. The disclosed system also enables aggregation and analysis of data over time to optimize throughput of the unitizer. This information can be provided to other systems within a factory, such that productivity of the entire factory can be easily monitored and improved. Since the unitizers in a factory are frequently a substantial bottleneck to maximum factory throughput, the disclosed system also maximizes the output of the entire manufacturing factory.

In one embodiment, the disclosed system is implemented using a conventional computer system which includes software executable by a microprocessor to enable the computer to interact with programmable logic circuits (PLCs) within certain factory machinery. In such an embodiment, the software is executable to monitor factory machinery by interacting, via the PLCs, with one or more sensors, such as sensors within the unitizer or sensors proximate but external to the unitizer. For example, the disclosed system in various embodiments interacts with a unitizer in a corrugated box manufacturing factory by interacting with sensors within the unitizer (such as sensors to determine each time the unitizer applies a strap) and/or by interacting with sensors proximate to the unitizer (such as image sensors mounted in cameras or photo eyes proximate to the unitizer).

In various embodiments, the data collected by the system provides information immediately usable by a consumer of the data. For example, if the system detects that the unitizer is malfunctioning or is otherwise inoperable, the system provides a factory or unitizer manager with an alert indicating the nature of the malfunction and probable or suggested remedies for the malfunction. In this embodiment, the alert enables the manager to respond quickly and appropriately to maximize the likelihood that the unitizer will be brought back online as quickly as possible, which in turn reduces bottlenecks in the manufacturing factory. Thus, the disclosed system in one embodiment apprises factory personnel of problems with the unitizer that directly affect throughput and that require immediate attention.

In various embodiments, the system disclosed herein also enables factory personnel to address potential or actual safety violations committed in and around the monitored machine, thus enabling the factory personnel to better maximize the likelihood of maintaining a safer workplace environment. In one such embodiment, the system is configured to interact with one or more sensors, such as digital cameras or pressure sensors, which can sense the presence of an individual in a restricted area of the factory, and in particular a restricted area of the unitizer. In this embodiment, the system performs image-processing operations on the video or still image data captured by a digital camera to determine whether the video or photograph is of an individual or individuals in a restricted area. For example, the system determines whether video captured by a digital camera is of an individual, such as a unitizer operator, who has walked under a compression platen of a unitizer in a corrugated box factory. In the event such a possible or actual safety violation is detected, the system alerts factory personnel to the violation, such as by sending an email or other electronic communication to appropriate personnel or manager within the plant or remote from the plant. The system thus enables appropriate personnel, such as a manager, to deal with the safety violation as needed. In one such embodiment, this alert is based on the status of one or more components of the unitizer itself (such as whether the unitizers platen is not latched).

In the embodiments discussed above, long-term throughput is improved by reducing the amount of time the unitizer is inoperative due to either malfunctions or safety violations. In various other embodiments, the monitoring capabilities of the system also enable factory personnel to improve factory productivity in the long-term by aggregating data and reporting data about the performance of the unitizer. In these additional embodiments, the disclosed system captures and aggregates data to enable factory managers to determine systemic problems with the operation of the factory.

For example, in certain embodiments, the system tracks the throughput of a particular machine, such as a unitizer, when it is in two or more different modes of operation. In one such embodiment, the system tracks performance of a unitizer in a manual mode and an automatic mode and aggregates the data. The system creates one or more reports about the aggregated data regarding these modes. In this example, the ability to track the output of one or more unitizers in both a manual and an automatic mode enables comparisons of throughput between manual and automatic mode. Thus, by utilizing the system disclosed herein, a plant manager can determine whether it is more efficient to operate unitizers in manual or automatic mode, and does not need to rely on the representations of unitizer operators to determine which mode is most efficient.

Providing such reports about data detected by the disclosed system enables a factory manager to optimize productivity of the factory. For example, by utilizing the disclosed system, the factory manager can determine that automatic mode is, in fact, the most efficient mode in which to operate one or more unitizers. The disclosed system enables a quantification of this conclusion, and indicates that if such a situation is true, operation in automatic mode whenever possible is desirable. Such an exemplary analysis is an example of one way the disclosed system enables a factory manager to maximize throughput by analyzing reports about aggregate productivity data.

In other words, the present disclosure recognizes that productivity of the machinery that manufactures the products can be increased more than previously expected by enabling enhanced and safer operation of certain unitizing equipment and machinery, such as unitizers. The disclosed system enables productivity to be improved by providing immediate and long-term feedback about the performance of such unitizing equipment and machinery in the assembly line to factory managers or overseers.

It is therefore an advantage of the present disclosure to provide a system that enables monitoring and tracking of activity of unitizers in a manufacturing factory.

It is a further advantage of the disclosed system to provide reliable tracking and management of machine malfunction, safety or potential safety violations, and productivity data for unitizers.

It is an additional advantage of the disclosed system to aggregate data to enable a factory manager to determine one or more optimal ways to operate unitizers to ensure maximum factory output.

Additional features and advantages are described in, and will be apparent from, the following Detailed Description and the Figures.

BRIEF DESCRIPTION OF THE FIGURES

FIG. 5 is a screen shot of an example task definition interface displayed to a user of one embodiment of the system disclosed herein.

FIG. 6 is a screen shot of an example report generation screen displayed by one embodiment of the disclosed system FIG. 7 illustrates an example performance report created by one embodiment of the disclosed system for a unitizer in a corrugated box manufacturing factory.

FIG. 8 illustrates an example unit details report created by one embodiment of the disclosed system for a unitizer in a corrugated box manufacturing factory.

FIG. 10 illustrates an exemplary task activity report created by one embodiment of the disclosed system for a unitizer in a corrugated box manufacturing factory.

FIG. 11 illustrates an exemplary interactive report created by one embodiment of the disclosed system for a unitizer in a corrugated box manufacturing factory.

FIG. 14 illustrates one example of detailed information provided by one example embodiment of the disclosed system when the user selects Safety Concerns from an interactive report.

FIG. 16 illustrates a line graph of the efficiency and % Auto data fields over the course of five weeks, with a different point being drawn on the chart for each new week.

FIG. 17 contains a chart of efficiency and % Auto, wherein the user has moused-over the lines such that the actual data values are displayed.

FIGS. 19a, 19b, 19c, 19d, 19e, 19f, and 19g each illustrate a table containing example fault conditions that can result in one example embodiment of the disclosed system detecting an equipment malfunction.

FIG. 20 illustrates an example of an image captured by a video camera showing that three individuals are in a restricted area.

DETAILED DESCRIPTION

Figure 1:
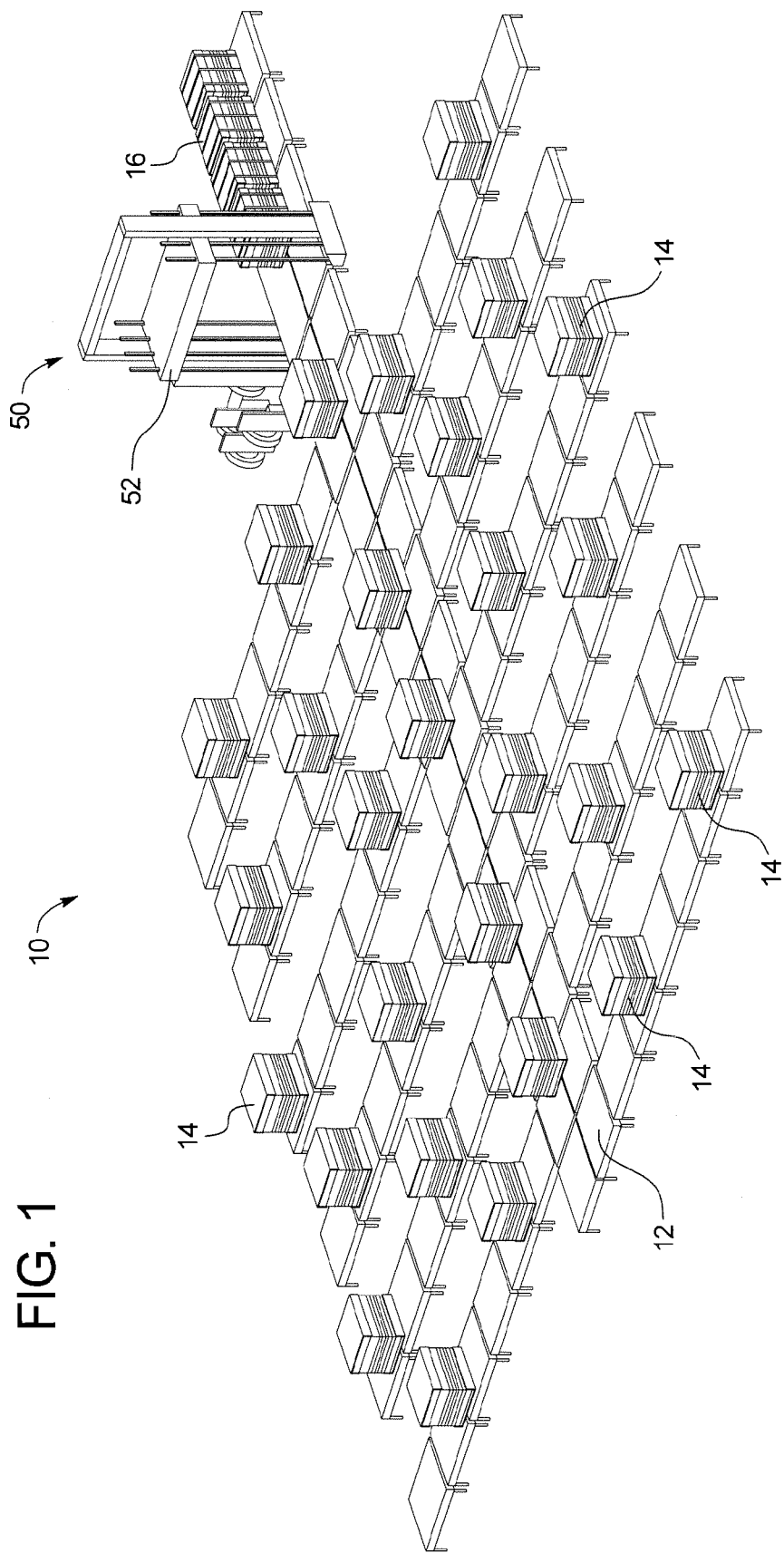
FIG. 1 is a schematic perspective representation of part of a corrugated manufacturing factory in which the disclosed system can be advantageously implemented.

The disclosed system and methods are usable in a manufacturing factory to improve reliability, productivity, and safety of certain machinery within the manufacturing factory. The factory setting typically includes a large, assembly-line environment in which raw or manufactured materials are turned into saleable products. The saleable products are created as the materials pass through various machines which each performs one or more particular functions in creating the products.

The disclosed system enables productivity to be improved by providing immediate and long-term feedback about the performance of certain unitizing equipment and machinery, such as unitizers, in the assembly line to factory managers or overseers. Depending on this productivity data, the factory manager can optimize the use of the monitored machinery.

The disclosed system also enables possible or actual safety violations to be detected, such as by providing a camera that captures video or still images of a restricted area of the monitored machine. With this data, the factory management (or plant management) can identify safety violations when they occur and prevent them from occurring in the future. Additionally, the detection and reduction of possible or actual safety violations also improves factory output by minimizing downtime of the machinery due to injury of its operators.

In an embodiment wherein the disclosed system is utilized in a corrugated box factory, raw materials travel through a corrugator, a gluing machine, a creasing machine, and the like, to create the corrugated boxes. The goal of such a factory is for the materials to travel as efficiently as possible through these machines, such that boxes are constructed as quickly as possible. In various embodiments, one or more software processes (other than the system disclosed herein) monitors the functioning of those machines.

In one embodiment, wherein the last step in creating a bail or pallet of corrugated boxes is to pass the unstrapped pallet or bail of corrugated boxes through a unitizer (also referred to herein as a strapper), the disclosed system communicates with the unitizer to monitor that process. In an embodiment, the disclosed system monitors the cycle time, which is the time it takes for an unstrapped bail or pallet of boxes to enter the unitizer, receive the appropriate number of straps, and exit the unitizer. The monitoring of the unitizer (or unitizers) provided by the disclosed system indicates a total output of the unitizer (or unitizers). The control enabled by the disclosed system provides a benefit realized as improved output or efficiency of the unitizer (or unitizers) and, thus, the entire factory.

It should be appreciated that in various embodiments, one or more unitizers can be monitored by the system disclosed herein. In these embodiments, the information gathered by the disclosed system can be provided to another system to enable plant managers to view data about the operation of the entire plant. Since unitizers may be bottlenecks regardless of their location on the plant floor (i.e., because product can only be produced as fast as the unitizer or unitizers can strap and discharge bails of product), the disclosed system thus enables a plant manager to monitor a bottleneck and improve overall plant output. Moreover, as will be discussed in detail below, the system may suggest remedies to problems detected in the unitizer (or unitizers), and thus aids in the automatic remedying of problems with plant throughput.

In one embodiment, the disclosed system also identifies specific weaknesses in one or more unitizers to which the disclosed system is connected. For example, the system provides information about possible safety infractions, machine issues, and the like with respect to the unitizer. Possible safety infractions are detected using photo eyes, digital cameras, pressure sensors, motion sensors, or other sensors appropriate to detect when a person is in a restricted area at a restricted time based in part of the conditions of one or more mechanisms of the unitizer. The system enables certain adjustments to the unitizer to be made from a terminal remote from the unitizer, such that real-time diagnostics can be converted into real-time troubleshooting without the need for a technician to inspect the unitizer on the factory floor.

In one embodiment, the disclosed system enables the detection of delays upstream or downstream of the unitizer. For example, when the disclosed system detects that the unitizer is waiting an inordinately long time to receive each successive pallet, the system infers that an upstream delay has occurred. Likewise, when the system detects that the unitizer needs to wait an inordinately long time to transfer a strapped pallet out of the unitizer due to lack of downstream availability of a conveyer or other transmission mechanism, the system infers that a downstream delay has occurred. These upstream and downstream delays can be sensed and reported as appropriate.

Turning now to the drawings, FIG. 1 is a schematic illustration of part of an example factory 10 in which the disclosed system can be employed. In the illustrated embodiment, the factory is a corrugated box factory, the task of which is to produce pallets of corrugated boxes.

In the illustrated embodiment, various machines (not illustrated) within the corrugated box factory convert raw material into corrugated boxes. For example, a corrugator may create corrugated material, and folding machines, gluing machines, creasing machines, and printing machines may perform the additional steps needed to convert corrugated material into boxes.

As shown in FIG. 1, after the corrugated boxes are constructed by the various machinery in the factory, the bails of folded boxes (or other suitable corrugated products, such as die cuts or sheets) are stacked on pallets 14 or any other suitable substrate, such as slip sheets or waste sheets. The bails are transported within the factory 10 by a conveyer system 12, such as a system of belts or rollers. In FIG. 1, the conveyer system is a complex system in which un-strapped bails of corrugated boxes or other corrugated products are provided from various different sources, and are funneled into a single main conveyer for transport to the unitizer 50. In the illustrated embodiment, the pallets are funneled into a single unitizer by the conveyer system 12. It should be appreciated that while a single unitizer 50 is illustrated in FIG. 1, the disclosed system is equally applicable in a setting in which more than one unitizer 50 is unitized. In this embodiment, the system disclosed herein monitors and provides feedback about more than one unitizer 50, and may enable a factory manager or other operator to select which unitizer to monitor.

FIG. 1 illustrates a corrugated box unitizer 50, which is an example of the machinery that can be monitored using the system and method disclosed herein. In the illustrated embodiment, when an un-strapped bail or pallet of corrugated boxes 14 is transported within the unitizer, a compression platen 52 of the unitizer 50 is lowered onto the top of the un-strapped bail or pallet 14. The compression platen 52 applies a force to the top of the bail of boxes, thereby compressing the load. After compression, the unitizer 50 applies one or more straps around the compressed bail of boxes in a conventional manner. Strapping the bails in this manner secures the boxes together for shipping and delivery.

In the illustrated embodiment, after compressing and applying straps to the un-strapped bails 14, strapped bails 16 emerge from the unitizer via the conveyer system 12. In this embodiment, strapped bails 16 are ready for transport to customers via truck, train, or other delivery vehicle.

It should be appreciated that in the illustrated embodiment, each of the unstrapped bails 14 passes through the unitizer 50 for compression, regardless of its source within the conveyer system 12. It should be appreciated that, depending on the plant and plant layout, one, two, or more unitizers 50 may be employed. In this embodiment, each unstrapped bail 14 passes through one of the unitizers 50. Thus, in various embodiments, delays or malfunctions of the unitizer or unitizers 50 can cause a significant bottleneck for the entire factory 10.

In an embodiment, the disclosed system detects whether and when the unitizer or unitizers 50 are operating in manual mode. In this embodiment, the system enables a plant manager to determine if one of the unitizers 50 is operating in manual mode too often, and enables the plant manager to take appropriate action to ensure that the manual mode operation is minimized. Moreover, in this embodiment, the disclosed system enables the plant manager to identify and attempt to eliminate delays caused by other machinery in the plant, such as other machinery that is causing delays in the unitizer or unitizers 50.

Figure 2:
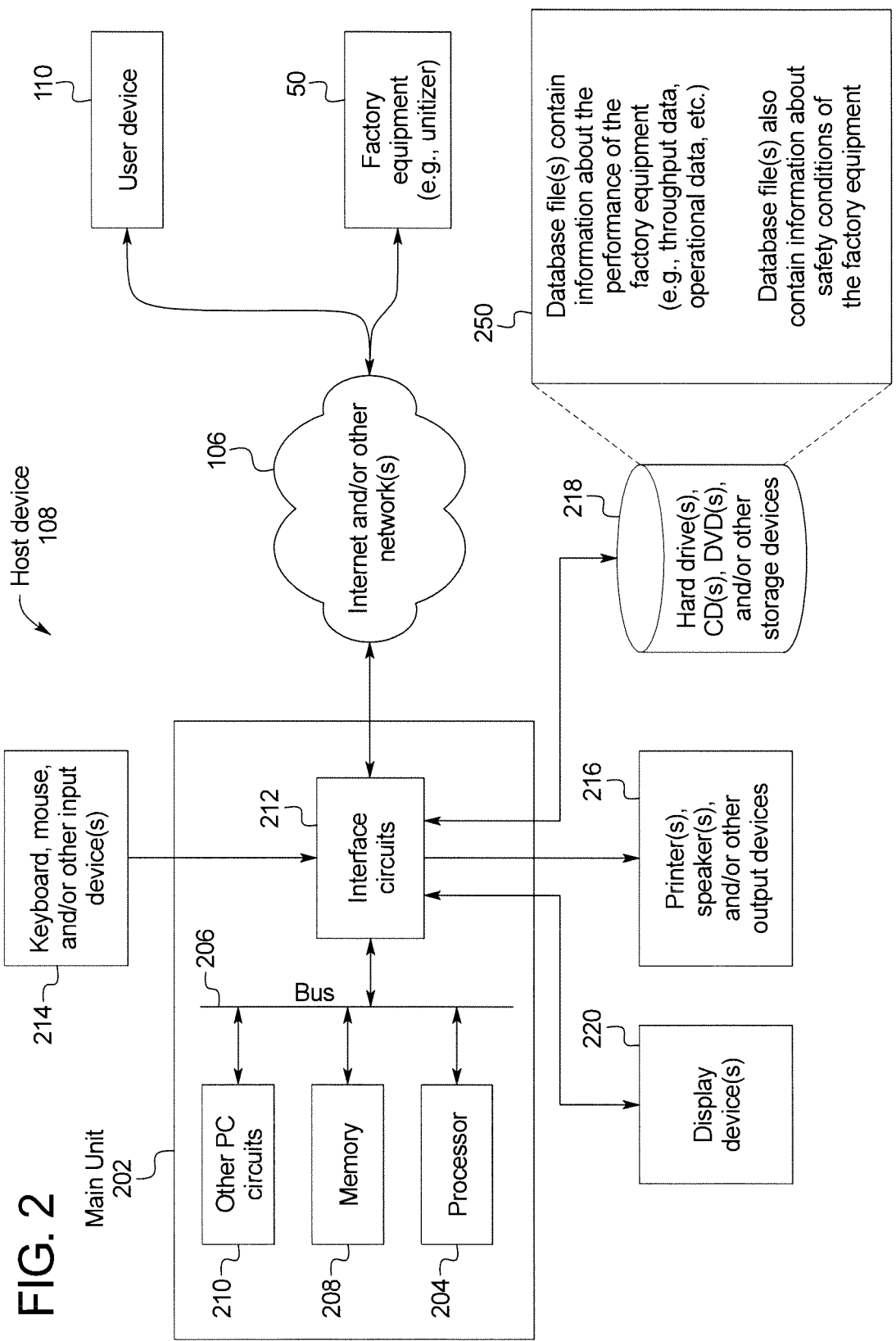
FIG. 2 is a block diagram generally illustrating one example of a host device architecture for implementing the factory machine monitoring system disclosed herein.

FIG. 2 is a block diagram illustrating an example of the electrical systems of a host device (e.g., host device 108) usable to implement the factory machine monitoring system disclosed herein. In one embodiment, the host device 108 corresponds to the factory machine monitoring system whose functions and capabilities will be discussed in more detail below.

In the example architecture illustrated in FIG. 2, the host device 108 includes a main unit 202 which preferably includes one or more processors 204 electrically coupled by an address/data bus 206 to one or more memory devices 208, other computer circuitry 210, and one or more interface circuits 212. The one or more processors 204 may be any suitable processor, such as a microprocessor from the INTEL PENTIUM® family of microprocessors. PENTIUM® is a trademark registered to Intel Corporation and refers to commercially available microprocessors.

In one embodiment, host device 108 includes memory 208. Memory 208 preferably includes volatile memory and non-volatile memory. Preferably, the memory 208 stores one or more software programs that interact with the other devices in the system, including the factory machinery being monitored, as described below. In addition or alternatively, these programs may interact with one or more user devices 110, such as one or more devices accessible by an operator or factory manager, to distribute information about the operation of factory machinery to the operator or factory manager (or other user of the disclosed system) in a convenient manner. These programs may be executed by the processor 204 in any suitable manner. The memory 208 may also store digital data indicative of the performance of factory machine 50, such as data about malfunctions, throughput, possible safety violations, supply of raw materials in the machine 50 (e.g., strapping material in a unitizer), and the like.

The interface circuit 212 may be implemented using any suitable interface standard, such as an Ethernet interface and/or a Universal Serial Bus (USB) interface. One or more input devices 214 may be connected to the interface circuit 212 for entering data and commands into the main unit 202. For example, the input device 214 may be a keyboard, mouse, touch screen, track pad, track ball, isopoint, and/or a voice recognition system.

One or more displays 220, printers, speakers, and/or other output devices 216 may also be connected to the main unit 202 via the interface circuit 212. The display 220 may be a cathode ray tube (CRT), liquid crystal display (LCD), or any other type of display. The display 220 generates visual representations of data during operation of the host device 108. For example, the display 220 may be used to display information about the performance or operation of the factory machine 50, such as throughput data or safety violation information. Alternatively or in addition, the display 220 may be utilized to display real-time video captured by a sensor in the vicinity of the factory machine 50, such as real-time video of a safety-restricted area of a unitizer 50.

One or more storage devices 218 may also be connected to the main unit 202 via the interface circuit 212. For example, a hard drive, CD drive, DVD drive, and/or other storage devices may be connected to the main unit 202. The storage devices 218 may store any type of data used by the host device 108. In one example described in more detail below, the storage device 218 stores information 250 about the performance of the piece of factory machinery, and particularly the unitizer(s) 50. This information may include historical performance data (such as throughput data), data about the present state of the machine (such as whether the machine is presently malfunctioning or presently needs to be re-stocked with raw materials), or video data captured by a camera proximate to the machine.

In one embodiment, the host device 108 exchanges data with both unitizer(s) 50 and a user device 110. For example, as discussed in detail below, the host device 108 may determine information about the functioning of unitizer(s) 50 based on one or more sensors associated with the unitizer(s) and/or other machinery associated with the unitizer (e.g., a sheet counter, a bar code reader, a weighing device, etc.), and may make that information (or a representation of that information) available to a factory manager or unitizer operator at user device 110.

In one embodiment, the host device 108 of FIG. 2 receives data from one or more programmable logic circuits (PLCs) associated or contained within the factory machine 50. For example, if the disclosed system is used to monitor a unitizer device as factory machine 50, a PLC within the unitizer may store data about the state of the machine, the settings of various sensors and switches of the machine, and other appropriate data that the disclosed system needs to appropriately monitor and control the unitizer. In a further embodiment, the PLC enables the disclosed system to retrieve data from one or more sensors, such as to retrieve a digital image from one or more digital cameras, to indicate that a safety infraction has occurred.

In a further embodiment, the host device 108 receives an input from the user device 110 and provides that input to the factory machine 50 to affect a change in the way the factory machinery 50 is operating. For example, the host device 108 may enable a factory manager to switch from a manual mode of operation to an automatic mode of operation or vice versa. In one embodiment, the input provided by the disclosed system is sent to a PLC associated with the factory machine, such as the PLC used to monitor and control a unitizer as discussed above.

In one embodiment, this connection of devices (i.e., the host device 108, user device 110, and factory machine 50) is facilitated by a network connection over the Internet and/or other networks, illustrated in FIG. 2 by cloud 106. The network connection may be any suitable network connection, such as an Ethernet connection, a digital subscriber line (DSL), Wi-Fi connection, a cellular data network connection, a telephone line-based connection, a connection over coaxial cable, etc. In another embodiment, the connection between host device 108, factory manager device 110, and/or factory machine 50 may be by a direct connection, such as a direct serial connection.

Access to a host device 108, user device 110, and/or factory machine 50 may be controlled by appropriate security software or security measures. An individual user's access can be defined by the host device 108 and limited to certain data and/or actions. For example, certain users may be defined as managers, certain users may be defined as unitizer operators, and/or certain other users may be defined as maintenance or management, as discussed in more detail below. Accordingly, users of the system may be required to register with one or more host devices 108, user device 110, and/or factory machine 50 prior to viewing data about or altering the operation of the factory machine 50 at user device 110.

In one embodiment, each user device 110 has a similar structural makeup to that described above with respect to the host device 108. That is, each user device 110 includes a display device, at least one input device, at least one memory device, at least one storage device, at least one processor, and at least one network interface device. It should be appreciated that by including such components, which are common to weft-known desktop, laptop, or mobile computer systems (including smart phones, tablet computers, and the like), user device 110 facilitates interaction of a factory manager, unitizer operator, or other user with the factory machine 50 being monitored.

In another embodiment, the disclosed system does not include a user device 110 separate from the host device 108. In this embodiment, a user of the disclosed system (such as a factory manager or unitizer operator) accesses the user interface and the various reporting and control functionalities by directly interacting with host device 108 via input devices 214 and/or display devices 220.

Figure 3:
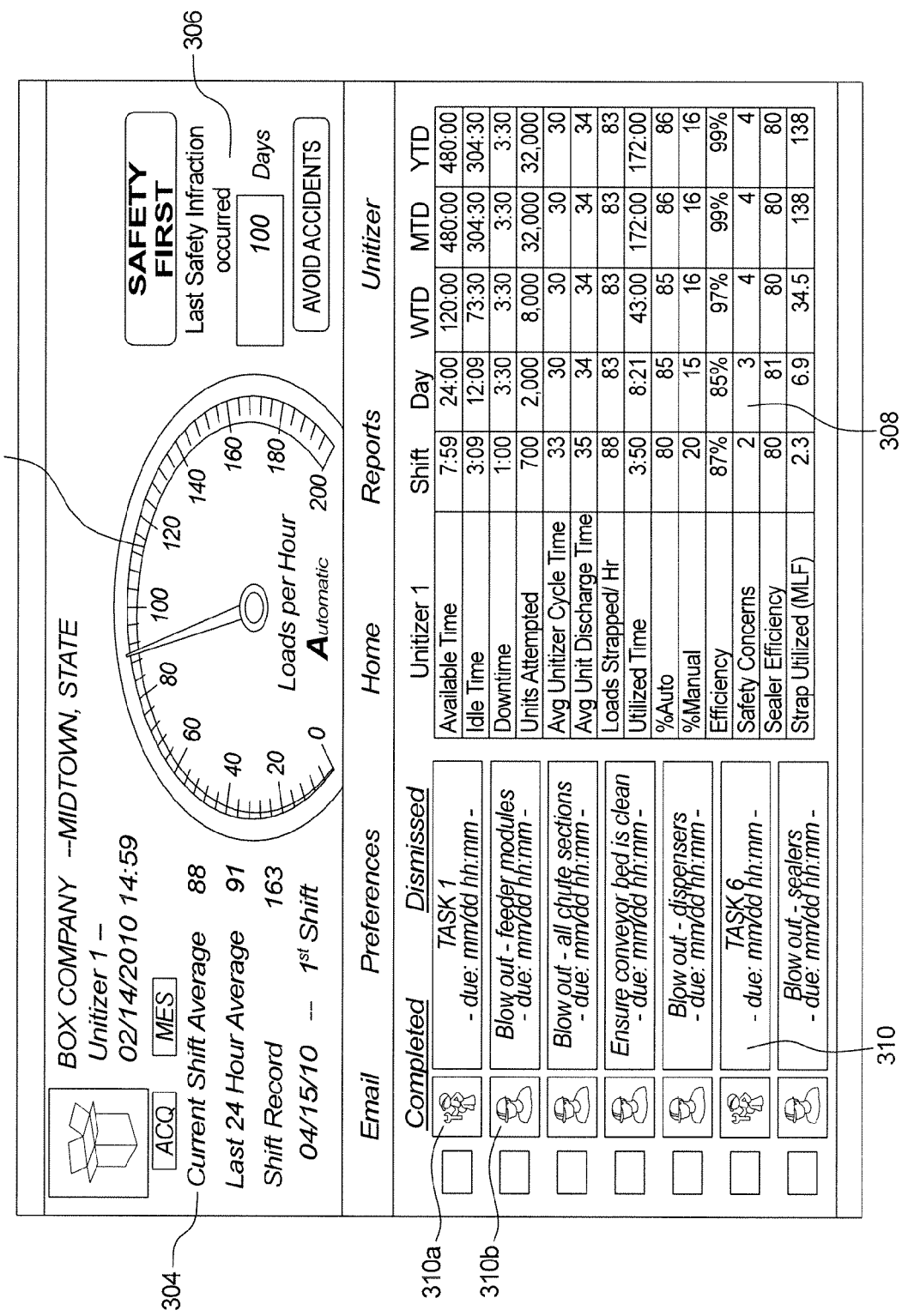
FIG. 3 is a screen shot of an example main interface dashboard displayed to a user of one embodiment of the system disclosed herein.

In various embodiments, the system disclosed herein displays an interface to a user, such as a unitizer operator, that replicates the dashboard of an automobile or other vehicle. Such an interface is referred to herein as a "dashboard." FIG. 3 illustrates an exemplary dashboard that can be displayed by the disclosed system. It should be appreciated that in other embodiments, the system disclosed herein presents a manager with different types of user interfaces and/or displays different sets of information within the user interface.

Referring now to FIG. 3, an embodiment of the user interface 300 of the disclosed system is illustrated. In this embodiment, the user interface 300 is displayed to the unitizer operator or other user on a display device, such as the display device 220 illustrated in FIG. 2. The interface 300 discussed in FIG. 3 and the figures that follow pertain to a unitizer in a corrugated box factory. It should be appreciated, however, that similar interfaces could be provided for other factory machinery depending on the appropriate reporting metrics (e.g., temperature, vibration, etc.) necessary to monitor for that other machine.

In the illustrated embodiment, the interface 300 displays a metaphor for a speedometer 302 in the center of the display screen. The speedometer 302 illustrates a calculated number of loads per hour handled by a unitizer, and outputs the calculated rate of loads per hour using a rotary indicator. That is, the rotary indicator indicates the number of pallets unitized, or strapped, by a unitizer on the floor of a factory. In various embodiments, the maximum number reflected on the speedometer 302, and the rate at which the speedometer 302 refreshes, can be defined in a preferences window displayable by the disclosed system. In the illustrated embodiment, the speedometer 302 also includes an indication of whether the unitizer is operating in manual or automatic mode—specifically, the illustrated screen shot indicates that the unitizer is currently operating in automatic mode.

In the illustrated embodiment, the dashboard also displays a portion 304 that contains numerical indicators of the rate of loads per hour handled by the unitizer. In this embodiment, the area 304 indicates that the current shift average is 88 loads per hour, and that the last twenty-four hour average was 91 load per hour. Further, the area 304 contains an indication of the current shift and date, such that the data displayed about loads per hour can be analyzed in the proper context.

In the illustrated embodiment, the dashboard displayed to the manager by the disclosed system also includes a safety information area 306. The safety information area 306 in the illustrated embodiment is in a prominent position near the top of the dashboard 300, such that safety issues (or lack thereof) are immediately visible to the manager. Safety area 306 in the illustrated embodiment includes a box that illustrates the amount of time that has passed since the last safety infraction. Specifically, 100 days have passed according to FIG. 3.

In various embodiments, the system disclosed herein relies on one or more sensors to determine whether a safety infraction has occurred. In an embodiment, the system relies on an image sensor in a digital still or video camera to determine whether an individual is in a restricted area of a unitizer. For example, if an individual is standing under a compression platen 52 of unitizer 50, the disclosed system may use one or more photo eyes to detect a safety infraction. The system could also rely on one or more different kinds of sensors, such as pressure or motion sensors, to detect where an individual is standing, such as by detecting whether a pressure sensor in an area under a compression platen 52 of unitizer 50 is activated, to determine that a safety infraction has occurred. In other words, the system not only determines if a person is in a position to be hurt, but also the status or condition of one or more mechanisms of the machine to determine if the machine can hurt the person in that position.

In a further embodiment, the system determines that a safety infraction has occurred based on data from a plurality of sensors. In this embodiment, for example, the system relies on an image sensor or pressure sensor to determine where an individual is located, and further relies on a sensor within the unitizer to determine a state of the unitizer. If the unitizer is determined to be in a state in which the user's position is dangerous or potentially dangerous (e.g., if the system detects that the compression platen 52 of the unitizer 50 is raised and not locked, and the individual is positioned under the compression platen 52), the disclosed system registers a safety infraction and takes appropriate action as discussed below. Specifically, the system generates and sends an urgent email (or other communication) to a supervisor, wherein the communication contains a digital image of the infraction captured by a digital camera and including a time and date stamp. In one embodiment, the determination of a safety violation is based, in part, on whether a platen latch engagement state is satisfied or not.

In an embodiment, the color of the background of area 306 changes depending on how much time has passed since the last safety infraction. For example, if a safety infraction has not occurred within the past 24 hours, the system displays the background of safety information area 306 as green. If a safety infraction has occurred sometime within the last 24 hours, the system displays the background of safety information area 306 as yellow. Finally, if an infraction has occurred within the past hour, the system displays the background of safety information area 306 as red. Further, if the last safety infraction has occurred within the past 24 hours, the system displays safety information area 306 with an indicator of the number of hours since the last infraction, as opposed to the number of days since the last infraction.

It should be appreciated that by displaying safety information area 306 in different colors depending upon the amount of time since the last safety infraction occurred, the disclosed system enables a manager to determine, at a glance, whether a potential safety issue needs immediate attention. For example, if the supervisor or manager sees that a safety violation has occurred within the past hour, the supervisor or manager can immediately reprimand or otherwise address an employee or machine operator who has just committed a safety violation, while the employee is still working his or her shift at the unitizer.

In a further embodiment, wherein the disclosed system displays a live video feed of an area adjacent to factory machinery, the manager can approach the employee and show the employee a photograph or a video of the violation (such as in the event the employee disputes that such a violation occurred). Moreover, by recording the employee's actions, the disclosed system enables the creation of a file detailing safety violations that have occurred, such that the factory supervisor or manager can take affirmative steps to minimize the chance that such violations occur in the future.

Area 308 of FIG. 3 displays a report of relevant activity for a monitored piece of factory machinery. Specifically, area 308 illustrates relevant data about Unitizer 1, and provides that data in varying time frames including per shift, per day, week to date, month to date, and year to date. This functionality will be described in more detail below.

Area 310 of FIG. 3 is illustrated in the lower-left corner of the dashboard 300. In the illustrated embodiment, area 310 includes various areas for displaying information about tasks to be performed. Specifically, in this embodiment, area 310 illustrates seven tasks to be performed. The top task, which is entitled "TASK 1," is shaded in red (or otherwise darkened), indicating that it is overdue. In an embodiment, the fact that "TASK 1" is overdue is determined based on the passage of more time than an overdue task value defined by the user in the overdue task time area of the preferences screen. The definition of the overdue task value will be discussed in more detail below.

In FIG. 3, the remaining tasks (i.e., the second through the seventh tasks) are not overdue, meaning their due date has either not occurred yet, or the amount of time that has passed since the due date does not exceed the overdue task time set by the manager. Area 310 contains a check box for each task. In this embodiment, the manager selects one or more of the task by putting a check mark in the box to the left of the task name, and selects either "completed" or "dismissed" to cause the selected tasks to be marked "completed" or "dismissed," respectively. In another embodiment, the manager simply clicks a check box to indicate to the system that the task is completed. It should be appreciated that other suitable markers or indicators for indicating a task has been completed may be employed.

In one embodiment, the disclosed system displays another interface (not shown) that enables a manager to send an electronic communication (such as an email message) from the disclosed system to an appropriate recipient. Specifically, the disclosed system enables the manager to generate an email message containing safety infraction data (such as a digital image of the infraction), information sensed by the system, aggregated data created by the system, reports generated by the system, custom messages entered by the manager, or other appropriate information.

In one embodiment, the disclosed system enables a user to alter a plurality of preferences of the system and to configure the system to the user's preferences. For example, the disclosed system enables the user to specify a refresh rate for the speedometer display 302, such that the speedometer display 302 refreshes according to the specified rate. In this embodiment, the system also enables the user to select a particular piece of unitizing equipment, such as by selecting from among a plurality of unitizers or other unitizing equipment. The preferences interface may also enable the user to specify the start and end times for various shifts, such as a first shift start and end time, a second shift start and end time, and a third shift start and end time.

In one embodiment, the preferences interface enables system implementator to specify the name of his or her company, a company logo, a maximum speedometer reading, a default email address (e.g., the email address from which emails will be generated), a company logo, a company webpage address, and/or a number of days to keep historical data. The information that can be altered can be seen, for example, in the upper-left corner of the interface 300 illustrated in FIG. 3.

In one embodiment, the system disclosed herein enables a user to specify one or more email addresses and subject line preferences. In this embodiment, the system enables the user to input an email address and a person's name, such that if the user wishes to send an email using the disclosed system, he or she can simply select from the entered email addresses. In an embodiment, this enables a user to keep a list of email addresses in the system to which he or she often sends email.

In a similar vein, the disclosed system enables the user to specify a plurality of subject lines for email sent using the disclosed system. For example, the system may allow the user to enter subjects frequently accompanying email about performance of a unitizer, such as "Turntable Fault," "Electrical Fault," "Need Top Boards," "Need Pallets," "Need Maintenance," "Quality Concern," and other similar subjects. By pre-defining these subjects, the system enables the user to quickly create email messages that have consistent subject lines.

In one embodiment, the system also enables the user to activate or deactivate either email addresses or subjects by checking a box associated with each subject or email address the user wishes to have activated.

Figure 4:
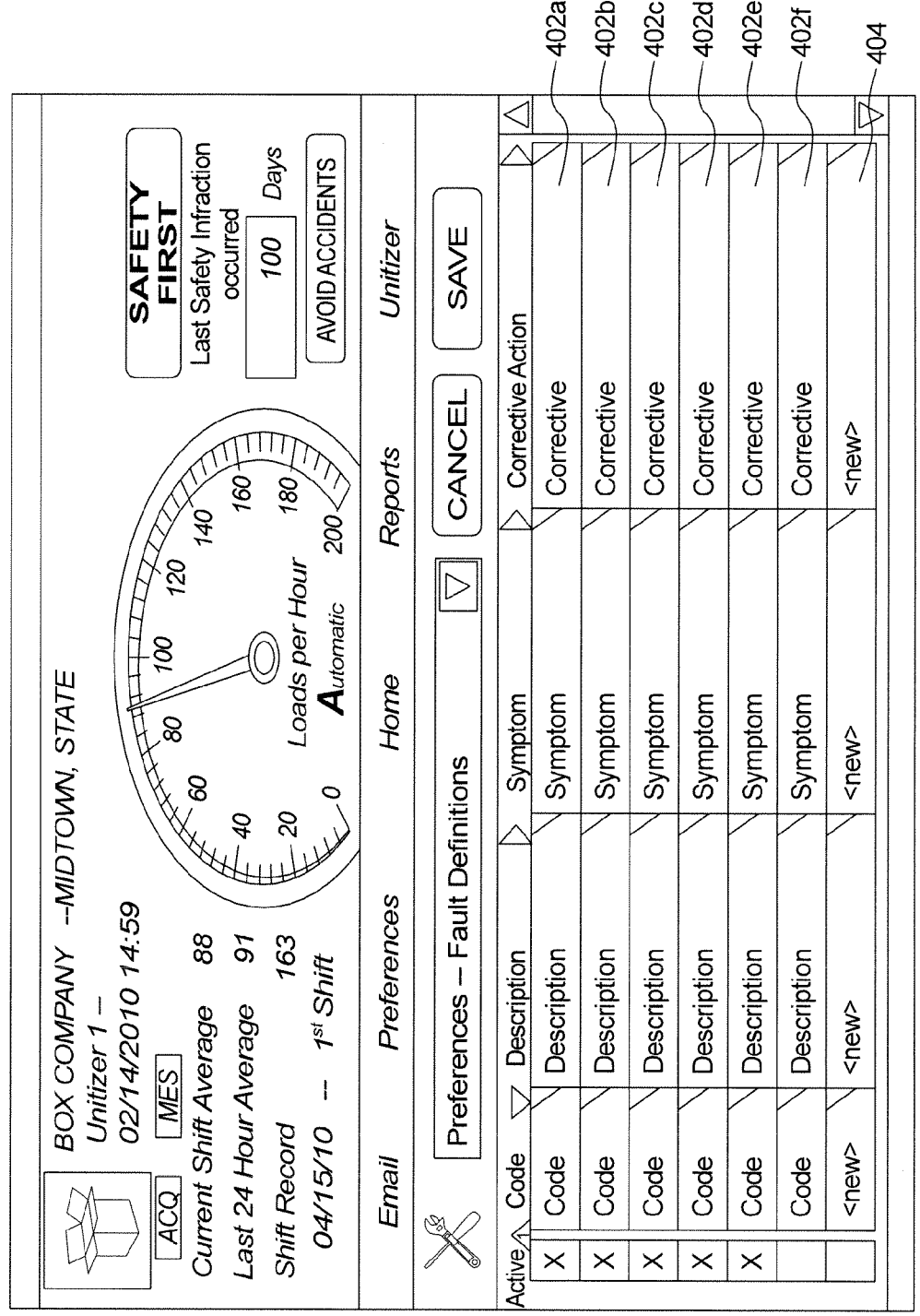
FIG. 4 is a screen shot of an example fault definition interface displayed to a user of one embodiment of the system disclosed herein.

FIG. 4 illustrates a screen shot 400 in one embodiment of a fault definition interface available to a user of the system disclosed herein. In various embodiments, the developer of the software running on the disclosed system creates the displayed faults, such as those illustrated in FIG. 4. In other embodiments, the disclosed system is adaptable based on customer preference, and may enable the customer to create one or more faults detectable by the system.

As noted above, in some embodiments the system disclosed herein is pre-populated with a plurality of faults designed by the manufacturer of the software. In the embodiment reflected by FIG. 4, the disclosed system enables a user to define a plurality of faults by specifying certain information about those faults within the interface 400. As illustrated, the fault definition area includes six rows 402*a*, 402*b*, 402*c*, 402*d*, 402*e*, and 402*f*, which each enable the user to define a fault. In this embodiment, the system enables a user to select, for each fault 402*a*, 402*b*, 402*c*, 402*d*, 402*e*, and 402*f*, whether the fault is active (i.e., whether the system will check for a particular fault occurring), a fault code, a description, a symptom, and a corrective action. In one embodiment, the code and description are user-specifiable without selecting from a set of codes or descriptions. Further, fault definition area 404 enables the user to create a new fault by entering a new fault code, description, symptom, and corrective action.

In the embodiment illustrated in FIG. 4, for each fault, the system enables the user to specify a symptom and a corrective action. In one embodiment, the symptom must be selected from a pull-down list of symptoms, wherein the list of symptoms includes a list of data sensible by the disclosed system. If a system has a sensor to indicate, for example, that a unitizer is out of strapping material, a pull-down symptom corresponding to the lack of strapping material is selectable.

In one embodiment, the corrective action can be entered by a user as her or she desires. In this embodiment, corrective actions must be taken by users themselves, as there is no guarantee a user-specified corrective action can be performed automatically by the disclosed system. In another embodiment, the user can select corrective actions from a pull-down list of preset corrective actions, and the corrective actions correspond to actions that can be automatically taken by the system. For example, if the corrective action list enables a user to select "restart," the system disclosed herein may be able to shutdown and restart a unitizer without user intervention. In this way, a corrective action can be selected that will be performed automatically by the system, and not by the user of the system. In various embodiments, the system enables the user to select from a plurality of automatically-performed different corrective actions, and also to enter a desired action in the event the user wishes the corrective action to be manually performed.

Figure 5:
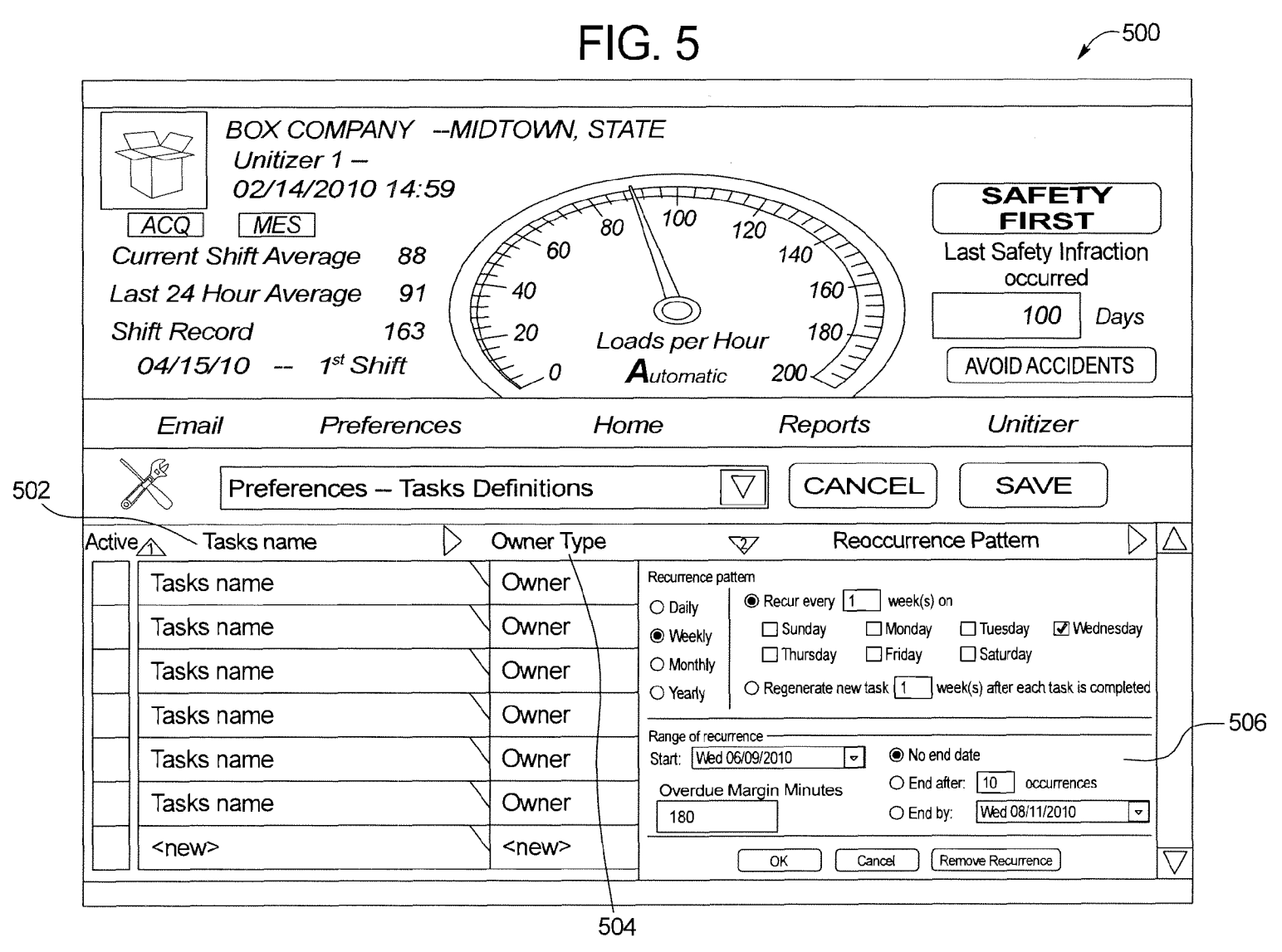

In one embodiment, the disclosed system also displays a task definitions interface window, such as the task definition window 500 shown in FIG. 5, if the user selects an appropriate area of the dashboard. In this embodiment, the system enables the user to define one or more tasks by specifying a task name in column 502, an owner identification in column 504, and a recurrence pattern using area 506.

In the illustrated embodiment, selecting the recurrence pattern area 506 enables the user to specify which days of the week the task should be performed, how frequently the task should be performed (e.g., daily, weekly, monthly, yearly), a start and end date for the task, and a task overdue value. As noted above, the overdue margin is defined in terms of an amount of time that has passed since the task was due. In one embodiment, if the system determines that a due date for the task and the overdue task margin have passed, the system will automatically take some action. In one embodiment, this action includes shading the task in red in the task display area, such as the area 310 of FIG. 3. In other embodiments, this action includes generating an email or other message, displaying a reminder, or the like.

Figure 6:
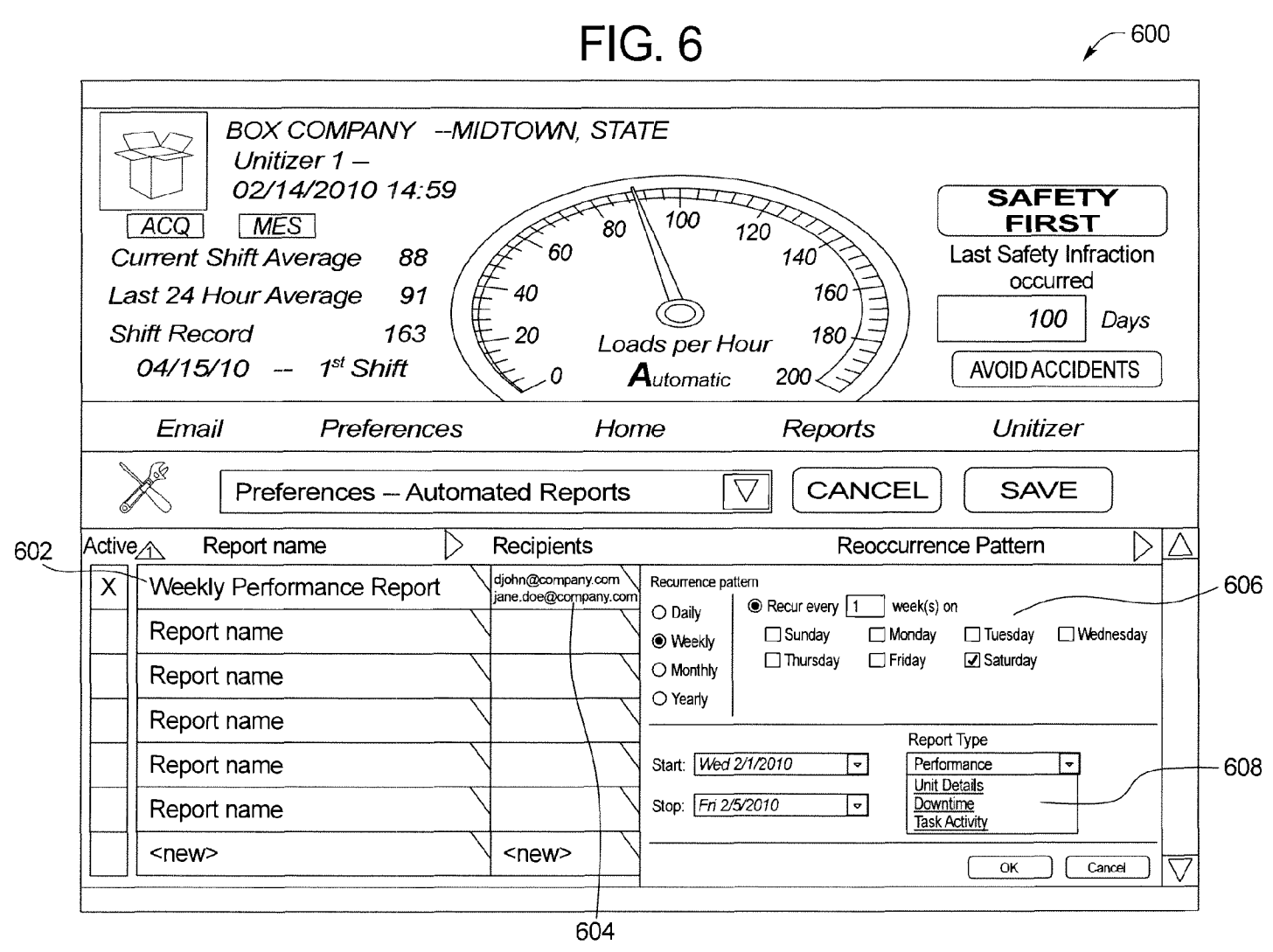

FIG. 6 illustrates a screen shot of an example report generation screen 600 displayed by the system. In the illustrated embodiment, the system displays a plurality of rows, wherein a different report type can be specified for each row. Specifically, in the embodiment illustrated in FIG. 6, the screen 600 enables a user to enter a different report in each of seven different rows.

Area 602 contains the name of the only report in the illustrated embodiment that the user has created. Specifically, as indicated by area 602, the user of the system has created a report called "Weekly Performance Report." According to the data entered in area 604, the user has specified that the "Weekly Performance Report" should be sent to the recipients with email addresses "djohn@company.com" and "jane.doe@company.com." The right-most area 606 of the chart in screen 600 enables the user of the disclosed system to specify details about the report, including the recurrence options for the report. As discussed above with respect to FIG. 5 and the illustrated definition of user-definable tasks, area 606 enables a user to specify a desired recurrence for the "Weekly Performance Report." In the illustrated embodiment, the user has selected that "Weekly Performance Report" should be generated weekly, and should occur every week on Saturday. The start date specified for the report is Monday, Feb. 1, 2010, and the end date is Friday, Feb. 5, 2010. It should be appreciated that in screen shot 600, the user has not yet indicated his desired start/end dates, but that the user will specify a start/end date that span at least one Saturday such that the report is actually generated.

Area 608 also enables the user to specify a type of report to be generated. In the illustrated embodiment, the user has the option to select from four different reports to generate based on the contents of a pull-down menu. Specifically, the user can indicate a desire to generate a "Performance" report, a "Unit Details" report, a "Downtime" report, or a "Task Activity" report. In a further embodiment, the system enables the user to generate an "Interactive" report, the details of which will be discussed below. In various embodiments, these reports are generated from data collected by the sensors to which the disclosed system is operably connected. As an example, generating a "Performance" report may be done in one embodiment by detecting a number of times a sensor is triggered, which indicates that a load has been unitized. The report may provide details about the triggering of this sensor, such as by providing a total number of loads, an average loads-per-hour, a peak loads-per-hour, and the like.

Figure 9:
FIG. 9 illustrates an exemplary downtime report created by one embodiment of the disclosed system for a unitizer in a corrugated box manufacturing factory.

FIG. 7 illustrates an exemplary performance report 700 for a unitizer (Unitizer 1) in a corrugated box factory. FIG. 8 illustrates an exemplary unit details report 800 for a unitizer (Unitizer 1) in a corrugated box factory. FIG. 9 illustrates an exemplary downtime report 900 for a unitizer (Unitizer 1) in a corrugated box factory. FIG. 10 illustrates an exemplary task activity report 1000 for a unitizer (Unitizer 1) in a corrugated box factory. For the embodiments of these reports illustrated in FIGS. 7 to 10, the following table is a summary of what the terms in the report describe in one embodiment:

| Term | Description |
| --- | --- |
| Available Time | Shifts will be defined in preferences. Available time will be the shift start time, less the current time. Displayed in HH:MM:SS. |
| Idle Time | Available time, less the downtime and utilized time. Displayed in HH:MM:SS. |
| Downtime | Sum of downtime events for the selected period. A downtime event is determined from when a fault is received until the fault is cleared or the fault carries over to the next shift. Displayed in HH:MM:SS. |
| Units Attempted | Read and counted from the PLC register. |
| Avg Unit Cycle Time | Sum of all unitizer cycle times divided by Units Attempted: Unitizer cycle time is defined as the time from when a unit enters the strapper until the cycle is complete. Displayed in HH:MM:SS. |
| Avg Unit Discharge Time | Sum of all discharge times divided by units attempted: A discharge time is defined from when the cycle stops to when the unit exits the strapper. Displayed in HH:MM:SS. |
| Loads Strapped/Hour | Units attempted divided by available time in hours. |
| Efficiency: | Available time, less downtime, divided by available time. Displayed as a percentage. |
| Utilized Time | Sum of unit cycle times for the selected period. Displayed in HH:MM:SS. |
| % Auto | Sum of units recorded automatically divided by attempted units. |
| % Manual | 100% less the % Auto. |
| Safety Concerns | Sum of all safety infractions. |
| Sealer Efficiency | Total Cycles attempted, less total failures, divided by total cycles attempted for the period. |
| Strap Utilized (MLF) | Sum of lineal feet of strap used for all attempted units. |
| Unit ID | Date and Time stamp when unit cycle starts. |
| Unit Cycle Start | Time when unit cycle starts. Read from PLC. Displayed in HH:MM:SS. |
| Unit Cycle Stop | Time when unit cycle stops. Read from PLC. Displayed in HH:MM:SS. |
| Unitizer Cycle Time | Time elapsed from Unit Cycle Start to Unit Cycle Stop, in seconds. |
| Discharge Time | Time elapsed, in seconds, from Unit Cycle Stop to when the unit is discharged from the unitizer. (Read from PLC). |
| Unit Cycle Time | Sum of Unitizer Cycle Time and the Discharge Time. Displayed in HH:MM:SS. |
| Number of Strokes | Sum of strokes, (the unitizer platen comes down), during the Unitizer Cycle Time. Read from PLC. |
| Strap Lineal | Total lineal of strap used for the unit. |
| Downtime Code | Read from PLC when a fault is detected. |
| Downtime Event | Determined from when a fault is received until the fault is cleared or the fault carries over to the next shift. |
| Task | Task provided by system manufacturer for operators and maintenance. |
| Task Type | Operator or maintenance. |
| Task Due | Date and time the task is due. |
| Task Complete | Date and time the task was marked completed or dismissed. |
| Status | Status of the task. Complete, Dismissed, or Overdue. Overdue will be the status if the operator or maintenance does not mark the task complete or dismissed. |

In various embodiments, the format in which the above-noted types of data are displayed varies. For example, where the chart illustrated above reads "HH:MM:SS," the disclosed system may display the appropriate indication of time using a different time format or granularity.

It should be appreciated that other suitable reports, or reports containing different kinds of information, could be created by various embodiments of the system disclosed herein. For example, if a different kind of machine is being monitored, the disclosed system need not generate any of the unitizer-specific data contained in the reports illustrated in FIGS. 7 to 10.

In various embodiments, the system enables the user to print or email reports in different formats. These formats may include a portable document format (PDF), a comma-separated values ("CSV") format, a text format, a graphical format, or other appropriate formats. In various embodiments, selecting "email" for a particular report displays the email creation interface discussed above, such that the user can select from among the plurality of entered email addresses stored in the system and can insert one of the plurality of subject lines stored in the system. As noted above, this capability enables reports to be delivered in a consistent way to a designated universe of individuals. In other embodiments, the user can enter custom email addresses and/or subjects, and is not required to select from the predefined email addresses or subjects.

As noted above, the system disclosed herein enables multiple different kinds of users to interact with it. For example, the system may enable an "operator" type of user and a "maintenance" type of user to each interact with the system. In this embodiment, the "operator" is the primary user of the unitizer, and thus the primary unitizer of the disclosed system. In this embodiment, the operator utilizes the dashboard display to perform one or more of the following actions:
(a) complete and check off shift tasks;
(b) send emails to maintenance; and
(c) view the diagnostic screen.
In this embodiment, the "maintenance" user utilizes the dashboard display to perform one or more of the following actions:
(a) view and print reports;
(b) complete and check off preventative maintenance tasks;
(c) change what unitizer is being displayed;
(d) receive emails from operator; and
(e) add shift tasks.

In various embodiments, the "operator" and "maintenance" users perform different tasks enabled by the disclosed system as appropriate based on these individuals' respective roles and responsibilities. In various embodiments, other kinds of users can use the disclosed system, such as "factory manager" users (who, among other things, can modify preferences, add tasks, and print reports), "field technical" users (who, among other things, can troubleshoot the disclosed system), and "report generation" users (who, among other things, generate reports but generally do not input data).

In various embodiments, tasks can be assigned to be done by different types of users. For example, area 310 of FIG. 3 contains a listing of tasks to be done. In the illustrated embodiment, the iconic representation of a person to the right of the check boxes indicates a particular type of user to whom the task is directed. For example, the first task, "TASK 1," is to be performed by "maintenance" type users, as indicated by the maintenance icon 310a. On the other hand, the second task, "Blow out—feeder modules," is a task to be performed by an "operator" as indicated by the operator icon 310b.

Referring now to FIG. 11, an "Interactive" type report 1102 is illustrated in the screen shot 1100. In this interactive report, the user can select the rows of the report to obtain additional, detailed information about the data displayed in the report. In the embodiment illustrated in FIG. 11, the hand identifier next to the rows entitled "Downtime," "Units Attempted," "Avg Unitizer Cycle Time," "Avg Unit Discharge Time," "% Auto," "Safety Concerns," "Sealer Efficiency," and "Strap Utilized (MLF)" indicate that the user has selected each row for additional information. Selecting each of these rows will result in the disclosed system displaying a separate screen containing detailed data supporting the summary in the selected row.

Figure 12:
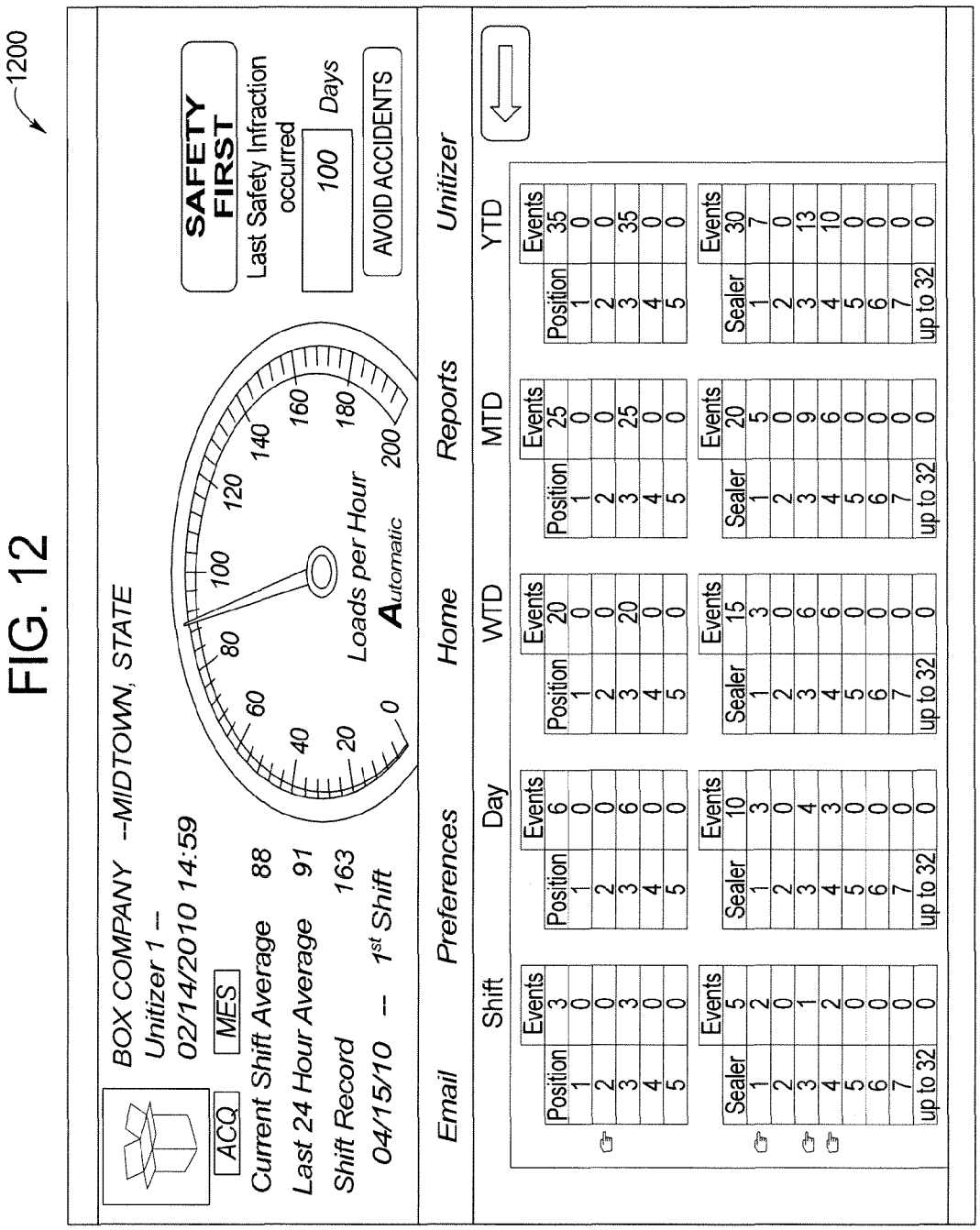
FIG. 12 illustrates one example of the detailed information provided by one embodiment of the disclosed system when the user selects Downtime from an interactive report.
Figure 13:
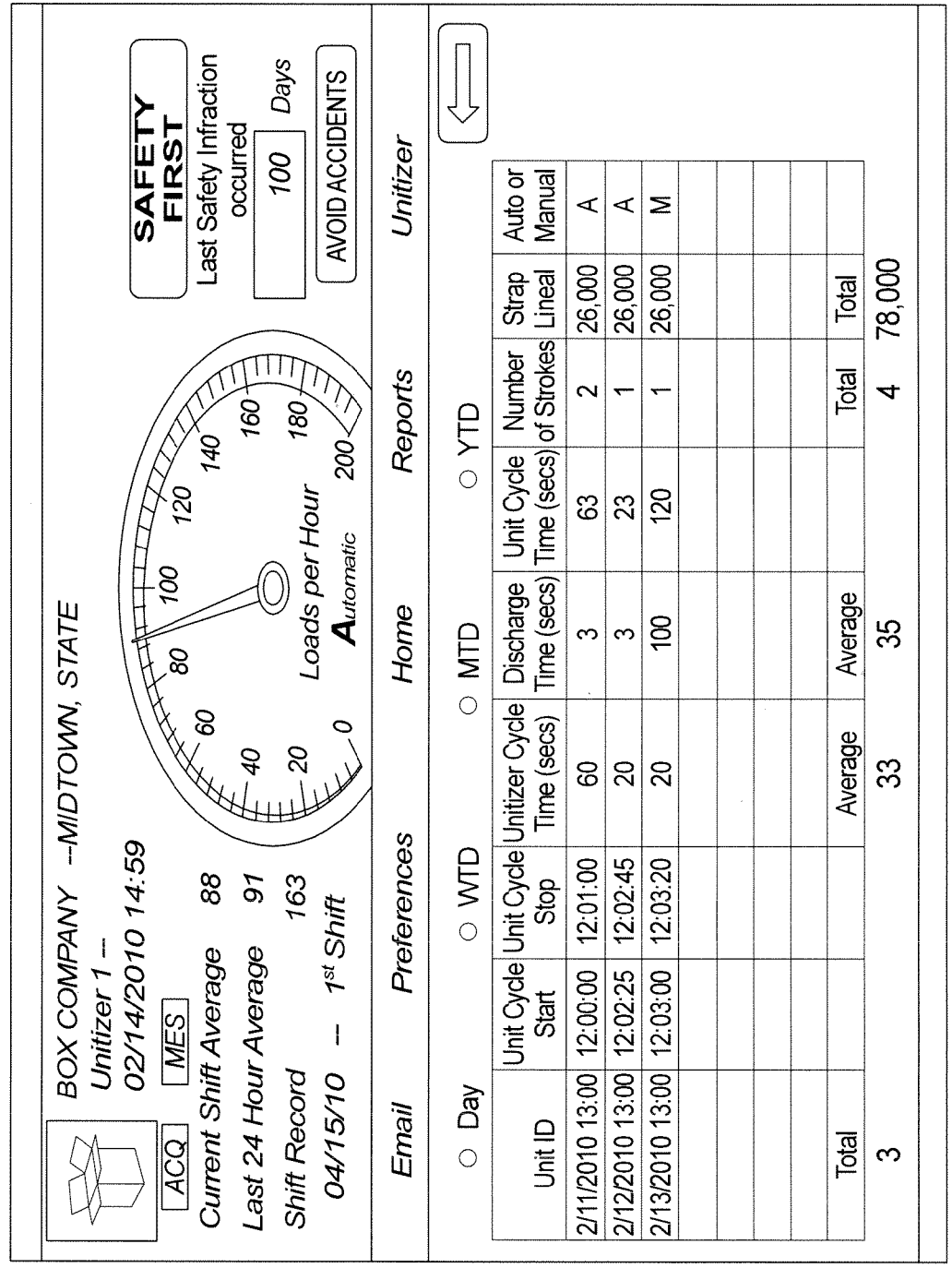
FIG. 13 illustrates one example of the detailed information provided by one example embodiment of the disclosed system when the user selects Units Attempted, Avg Unitizer Cycle Time, Avg Unit Discharge Time, % Auto, % Manual, or Strap Utilized (MLF) from an interactive report.
Figure 15:
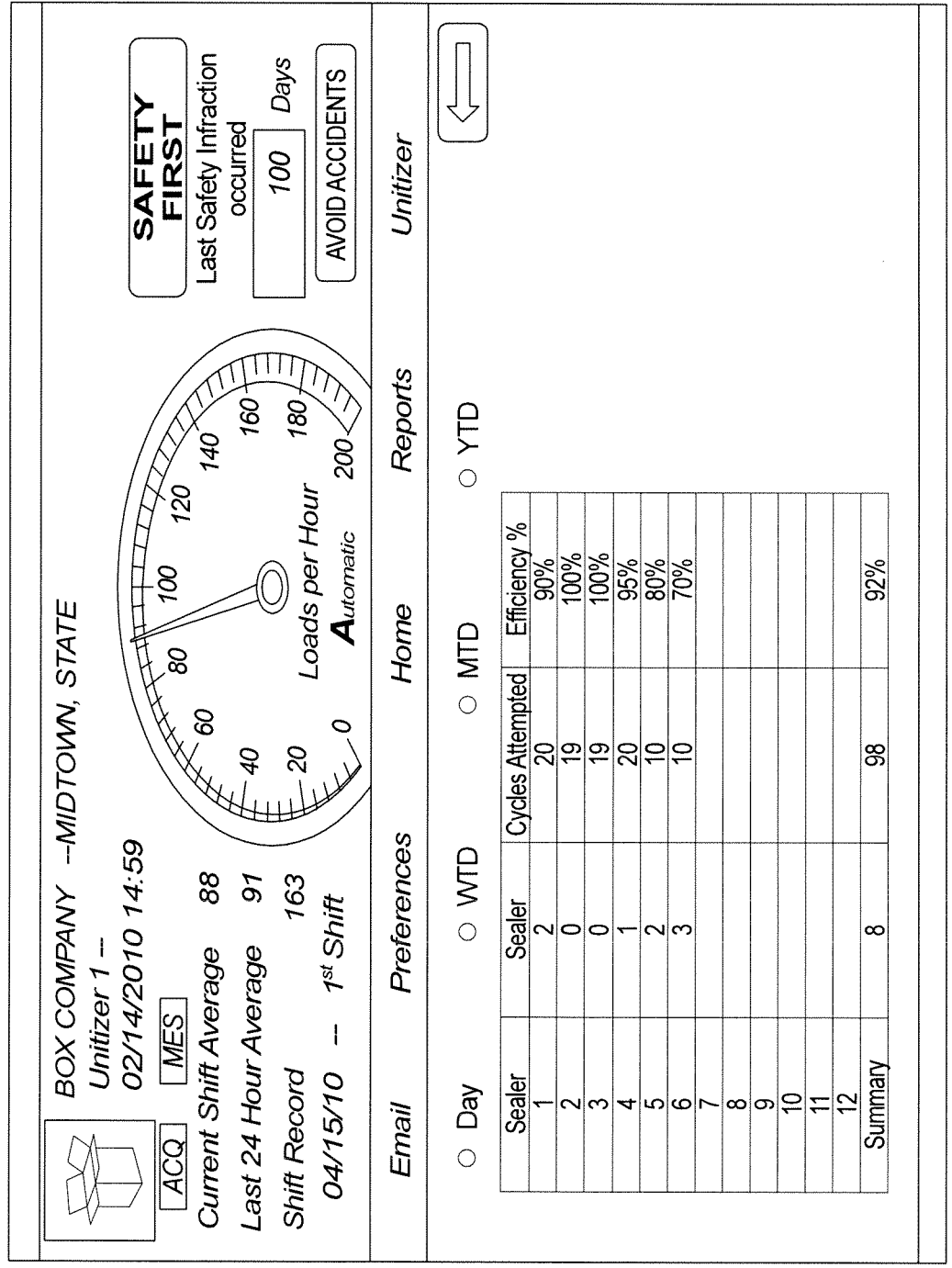
FIG. 15 illustrates one example of detailed information provided by one example embodiment when the user selects Sealer Efficiency from an interactive report.

FIGS. 12, 13, 14 and 15 illustrate screen shots of the exemplary detailed data supporting various selected rows of FIG. 11. Specifically, FIG. 12 illustrates the detailed information 1200 provided in an example embodiment when the user selects Downtime. FIG. 13 illustrates the detailed information 1300 provided in an example embodiment when the user selects Units Attempted, Avg Unitizer Cycle Time, Avg Unit Discharge Time, % Auto, % Manual, or Strap Utilized (MLF). FIG. 14 illustrates detailed information 1400 provided in an example embodiment when the user selects Safety Concerns. FIG. 15 illustrates detailed information 1500 provided in an example embodiment when the user selects Sealer Efficiency.

In various embodiments, one or more of the disclosed reports can be displayed as a line graph or other graphical representation of statistical data over time. For example, FIG. 16 illustrates a line graph 1600 of the efficiency and % Auto data fields over the course of five weeks, with a different point being drawn on the chart for each new week. FIG. 17 contains a similar chart 1700 of efficiency and % Auto, wherein the user has moused-over or otherwise selected one of the lines such that the actual data values are displayed.

It should be appreciated that in other embodiments, the disclosed system can generate other reports from other sensors with which it can communicate, depending on the specific desires of the manager and the type of machine being monitored.

Figure 18:
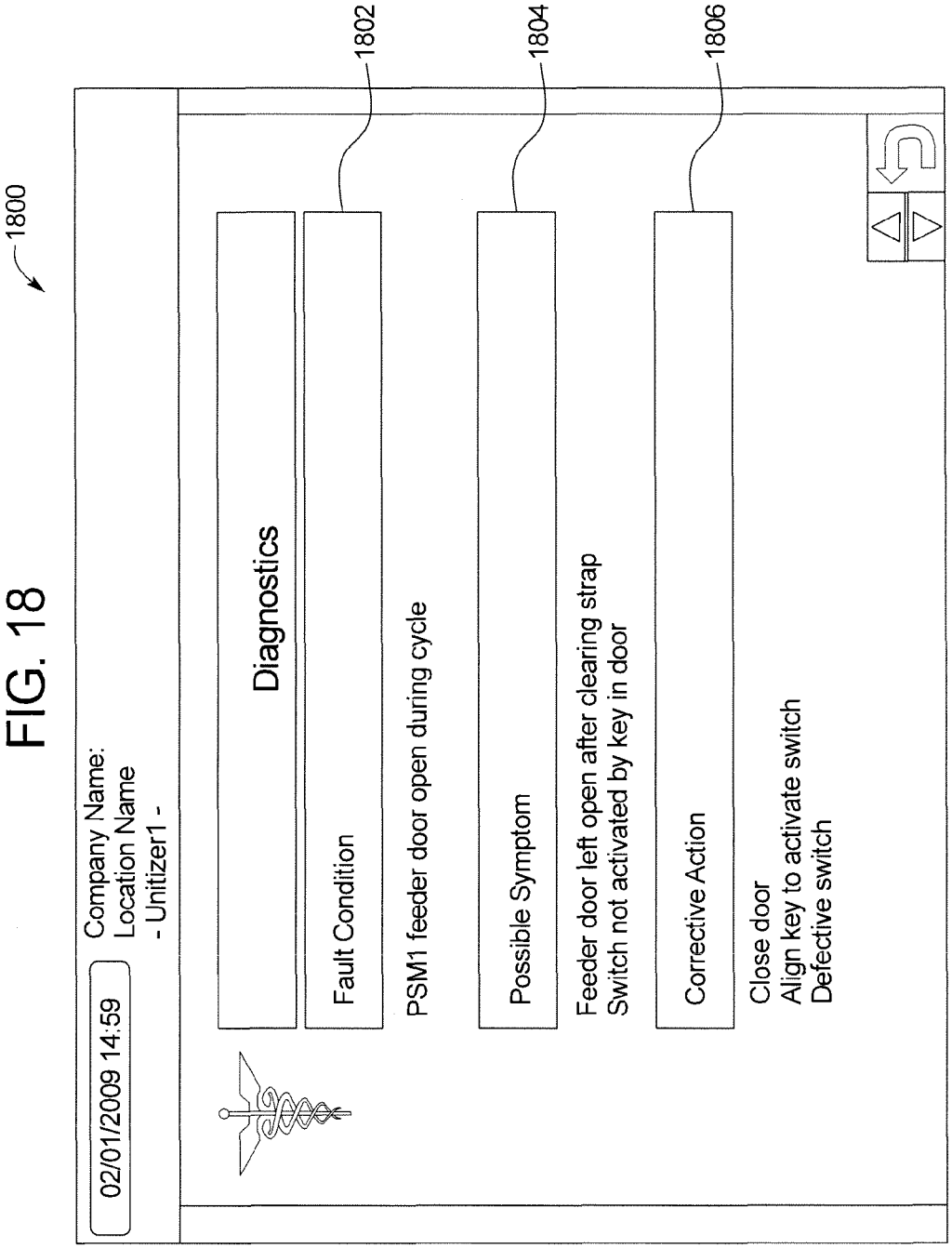
FIG. 18 illustrates a screen shot showing an example screen displayed by the disclosed system when a malfunction condition is detected.

FIG. 18 illustrates a screen shot showing an example screen displayed by the disclosed system when a malfunction condition is detected. Specifically, FIG. 18 includes a fault condition section 1802, which indicates that the detected fault condition is "PSM1 feeder door open during cycle." In this embodiment, a sensor on the PSM1 feeder door indicated to the disclosed system that the feeder door was open, and therefore triggered the fault condition. Area 1804 indicates that the possible symptom for such a fault condition could be that the feeder door was left open after clearing the strap from the unitizer, or that the switch on the feeder door was not activated by a key in the door. Area 1806 indicates corrective actions to be taken. Specifically, the corrective actions include closing the door, aligning the key to activate the switch, and/or replacing a defective switch.

The tables in FIG. 19a, 19b, 19c, 19d, 19e, 19f, and 19g each include a number of potential faults that can be detected by the disclosed system, including a description, possible symptom, causes and/or corrective actions, and suggested urgencies. It should be appreciated that the faults illustrated in FIG. 14 pertain specifically to unitizers. In other embodiments, other faults may be detected and corrected as appropriate and depending on the type of machine being monitored.

In various embodiments, the disclosed system monitors safety conditions to minimize the occurrence of safety violations. The system monitors for such possible safety violations using sensors such as photo eyes, video cameras, pressure sensors, motion sensors, or other sensors. In one embodiment, the disclosed system captures an image or other representation of the safety violation. For example, FIG. 20 illustrates an example 2000 of an image captured by a video camera showing that two individuals are in a restricted area. In a further embodiment, the system determines that a safety violation has occurred if both: (1) individuals are in a restricted area; and (2) the machine is in a particular state, such as an unlocked or safety-off state. In this example, the disclosed system generates an email which is sent to an appropriate recipient (such as a factory manager). The photograph illustrated in FIG. 20, which is time and date stamped, is attached to the email. In addition, the system registers a safety infraction, and resets the appropriate counter in the safety area 306 illustrated in FIG. 3. In various embodiments, the safety violation processes disclosed herein are unalterable by factory managers, such that the photograph is generated and an email is sent each time a safety infraction occurs.

In one embodiment, the system disclosed herein communicates with both the factory machine (such as a unitizer) and other factory monitoring software (such as the Kiwiplan software distributed by Kiwiplan, Inc.). In this embodiment, the system reports machine diagnostic issues to the factory monitoring software, and in response may receive one or more tasks to be completed as identified by the factory monitoring software. Likewise, in one embodiment the disclosed system reports safety infraction data, machine cycle data, whether the unitizer is operating in automatic mode or manual mode, and/or determinations of downstream and upstream delays to the factory monitoring software. In one embodiment, the factory monitoring software then optimizes production schedules, and sends any appropriate tasks and instructions back to the disclosed system for application through the monitored machine.

The above description of is exemplary of the features of the system disclosed herein. As noted, the disclosed system could be used to monitor and control any kind of factory machinery, and is not limited to monitoring and controlling unitizer in corrugated box factories. It should be understood that various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A unitizer monitoring system comprising:
   at least one processor;
   at least one sensor interface device configured to detect an output of at least one sensor associated with a unitizer;
   at least one display device; and
   at least one memory device which stores a plurality of instructions which, when executed by the at least one processor, cause the at least one processor to operate with the at least one sensor interface device, the at least one memory device, and the at least one display device to:
   (a) store an indication of the output of the at least one sensor,
   (b) determine whether a safety violation has occurred based on whether the stored indication of the output indicates an operator is under a platen of the unitizer when the platen is in an unlatched state, and
   (c) if the determination is that the safety violation has occurred, display an indication of the safety violation to at least one factory manager.

2. The unitizer monitoring system of claim 1, wherein the plurality of instructions, when executed by the at least one processor, cause the at least one processor to:
   (d) generate at least one report based on the stored indication of the output of the at least one sensor and based on at least one previously stored data set.

3. The unitizer monitoring system of claim 1, wherein the at least one sensor includes at least one photo eye, and wherein the safety violation includes a presence of the operator in a prohibited area of the unitizer.

4. The unitizer monitoring system of claim 1, wherein, if the determination is that the safety violation has occurred, the plurality of instructions cause the at least one processor to email the indication of the safety violation to the at least one factory manager.

5. The unitizer monitoring system of claim 4, wherein the emailed indication of the safety violation includes a copy of a digital photograph illustrating the safety violation.

6. The unitizer monitoring system of claim 5, wherein the digital photograph includes a timestamp.

7. The unitizer monitoring system of claim 1, wherein the plurality of instructions, when executed by the at least one processor, cause the at least one processor to operate with the at least one display device to display a user interface element indicating the determination that the safety violation has occurred.

8. The unitizer monitoring system of claim 7, wherein the wherein the plurality of instructions, when executed by the at least one processor, cause the at least one processor to operate with the at least one display device to display the user interface element indicating the determination that the safety violation has occurred in place of a user interface element indicating an amount of time since a last safety violation.

9. A unitizer monitoring system comprising:
   at least one processor;
   at least one sensor interface device configured to detect an output of at least one sensor associated with at least one unitizer;
   at least one display device; and
   at least one memory device which stores a plurality of instructions which, when executed by the at least one processor, cause the at least one processor to operate with the at least one sensor interface device and the at least one display device to:
   (a) determine at least one suboptimal condition of the at least one unitizer based on at least one report, wherein the at least one suboptimal condition includes a safety violation, and wherein the output of the at least one sensor includes an indication that the safety violation has occurred, and
   (b) display a suggested action to at least partially eliminate the suboptimal condition of the at least one unitizer, wherein the suggested action includes reprimanding at least one unitizer operator to address the safety violation.

10. The unitizer monitoring system of claim 9, wherein the output of the at least one sensor also indicates a position of a unitizer platen.

11. The unitizer monitoring system of claim 9, wherein the wherein the plurality of instructions, when executed by the at least one processor, cause the at least one processor to generate the at least one report based on the at least one suboptimal condition.

12. A unitizer monitoring system comprising:
   at least one processor;
   at least one sensor interface device configured to detect an output of at least one sensor associated with at least one unitizer;
   at least one display device; and
   at least one memory device which stores a plurality of instructions which, when executed by the at least one processor, cause the at least one processor to operate with the at least one sensor interface device and the at least one display device to:
   (a) store an indication of the output of the at least one sensor, (b) determine whether the at least one unitizer is operating in either a manual mode or an automatic mode based on the stored indication of the output,
  1. if the determination is that the at least one unitizer is operating in the manual mode:
    A. determine a manual mode amount of throughput for a designated period of time in the manual mode, and
    B. store an indication of the determined manual mode amount of throughput for said designated period of time in the manual mode, and
  2. if the determination is that the at least one unitizer is operating in the automatic mode:
    A. determine an automatic mode amount of throughput for a designated period of time in the automatic mode, and
    B. store an indication of the determined automatic mode amount of throughput for said designated period of time in the automatic mode,
(c) generate at least one report based on said stored indication of the determined manual mode amount of throughput and said stored indication of the determined automatic mode amount of throughput, and
(d) display any generated report to a factory manager to enable the factory manager to compare a productivity of operation of the at least one unitizer in the manual mode versus a productivity of operation of the at least one unitizer in the automatic mode.

13. The unitizer monitoring system of claim 12, wherein the output of the at least one sensor includes an indication of whether a safety violation has occurred at the at least one unitizer.

14. The unitizer monitoring system of claim 13, wherein the plurality of instructions, when executed by the at least one processor, cause the at least one processor to generate the at least one report based on the indication that the safety violation has occurred at the at least one unitizer.

15. The unitizer monitoring system of claim 13, wherein the plurality of instructions, when executed by the at least one processor, cause the at least one processor to generate the at least one report based on the indication that the safety violation has occurred at the at least one unitizer.

16. A unitizer monitoring system comprising:
at least one processor;
at least one sensor interface device configured to detect an output of at least one sensor associated with at least one unitizer;
at least one display device; and
at least one memory device which stores a plurality of instructions which, when executed by the at least one processor, cause the at least one processor to operate with the at least one sensor interface device and the at least one display device to:
(a) store an indication of the output of the at least one sensor,
(b) determine whether a safety violation has occurred based on the stored indication of the output, and
(c) if the determination is that the safety violation has occurred, display an indication of the safety violation to at least one factory manager, wherein said display includes a user interface element indicating the determination that the safety violation has occurred in place of a user interface element indicating an amount of time since a last safety violation.

17. The unitizer monitoring system of claim 16, wherein the plurality of instructions, when executed by the at least one processor, cause the at least one processor to:

(d) generate at least one report based on the stored indication of the output of the at least one sensor and based on at least one previously stored data set.

18. The unitizer monitoring system of claim 16, wherein the at least one sensor includes at least one photo eye, and wherein the safety violation includes a presence of a unitizer operator in a prohibited area of the at least one unitizer when one at least one designated condition of the at least one unitizer exists.

19. The unitizer monitoring system of claim 16, wherein the plurality of instructions, when executed by the at least one processor, cause the at least one processor to determine whether the safety violation has occurred based whether the stored indication of the output indicates an operator is in a designated portion of the at least one unitizer.

20. The unitizer monitoring system of claim 16, wherein, if the determination is that the safety violation has occurred, the plurality of instructions cause the at least one processor to email the indication of the safety violation to the at least one factory manager.

21. The unitizer monitoring system of claim 20, wherein the emailed indication of the safety violation includes a copy of a digital photograph illustrating the safety violation.

22. The unitizer monitoring system of claim 21, wherein the digital photograph includes a timestamp.

23. A unitizer monitoring system comprising:
at least one processor;
at least one sensor interface device configured to detect an output of at least one sensor associated with at least one unitizer;
at least one display device; and
at least one memory device which stores a plurality of instructions which, when executed by the at least one processor, cause the at least one processor to operate with the at least one sensor interface device and the at least one display device to:
(a) store an indication of the output of the at least one sensor,
(b) determine whether a safety violation has occurred based on the stored indication of the output,
(c) if the determination is that the safety violation has not occurred, display a user interface element indicating an amount of time since a last safety violation, and
(d) if the determination is that the safety violation has occurred, display an indication of the safety violation, wherein said display includes a user interface element indicating the determination that the safety violation has occurred in place of the user interface element indicating the amount of time since the last safety violation.

24. The unitizer monitoring system of claim 23, wherein the at least one sensor includes at least one photo eye, and wherein the safety violation includes a presence of a unitizer operator in a prohibited area of the at least one unitizer when one at least one designated condition of the at least one unitizer exists.

25. The unitizer monitoring system of claim 23, wherein the plurality of instructions, when executed by the at least one processor, cause the at least one processor to determine whether a safety violation has occurred based whether the stored indication of the output indicates an operator is in a designated portion of the at least one unitizer.

26. A unitizer monitoring system comprising:
at least one processor;
at least one sensor interface device configured to detect an output of at least one sensor associated with at least one unitizer;
at least one display device; and at least one memory device which stores a plurality of instructions which, when executed by the at least one processor, cause the at least one processor to operate with the at least one sensor interface device and the at least one display device to:
(a) determine at least one suboptimal condition of the at least one unitizer based on at least one report, wherein the suboptimal condition relates to a rate of use of the at least one unitizer, and wherein the output of the at least one sensor includes an indication of an amount of loads unitized over a designated time period, and
(b) display a suggested action to at least partially eliminate the suboptimal condition of the at least one unitizer.

27. The unitizer monitoring system of claim 26, wherein the suggested action includes selecting a different mode of operating the unitizer from a group consisting of an automatic mode and a manual mode.

28. A unitizer monitoring system comprising:
at least one processor;
at least one sensor interface device configured to detect an output of at least one sensor associated with at least one unitizer;
at least one display device; and
at least one memory device which stores a plurality of instructions which, when executed by the at least one processor, cause the at least one processor to operate with the at least one sensor interface device and the at least one display device to:
(a) determine at least one suboptimal condition of the at least one unitizer based on at least one report, wherein the suboptimal condition includes a safety violation, and wherein the output of the at least one sensor includes an indication of a position of a unitizer platen and that the safety violation has occurred, and
(b) display a suggested action to at least partially eliminate the suboptimal condition of the at least one unitizer.

29. A unitizer monitoring system comprising:
at least one processor;
at least one sensor interface device configured to detect an output of at least one sensor associated with at least one unitizer;
at least one display device; and
at least one memory device which stores a plurality of instructions which, when executed by the at least one processor, cause the at least one processor to operate with the at least one sensor interface device and the at least one display device to:
(a) store an indication of the output of the at least one sensor, wherein the at least one sensor includes at least one photo eye,
(b) determine whether a safety violation has occurred based on the stored indication of the output, wherein the safety violation includes a presence of a unitizer operator in a prohibited area of the at least one unitizer when at least one designated condition of the at least one unitizer exists, and
(c) if the determination is that the safety violation has not occurred, display a user interface element indicating an amount of time since a last safety violation.

30. A unitizer monitoring system comprising:
at least one processor;
at least one sensor interface device configured to detect an output of at least one sensor associated with at least one unitizer;
at least one display device; and
at least one memory device which stores a plurality of instructions which, when executed by the at least one processor, cause the at least one processor to operate with the at least one sensor interface device and the at least one display device to:
(a) store an indication of the output of the at least one sensor,
(b) determine whether a safety violation has occurred based on whether the stored indication of the output indicates an operator is in a designated portion of the at least one unitizer, and
(c) if the determination is that the safety violation has not occurred, display a user interface element indicating an amount of time since a last safety violation.

* * * * *

UNITED STATES PATENT AND TRADEMARK OFFICE
CERTIFICATE OF CORRECTION

PATENT NO. : 8,816,872 B2
APPLICATION NO. : 13/445481
DATED : August 26, 2014
INVENTOR(S) : Richard G. Newman et al.

It is certified that error appears in the above-identified patent and that said Letters Patent is hereby corrected as shown below:

IN THE CLAIMS

In Claim 8, Column 20, Line 18, delete "wherein the".
In Claim 11, Column 20, Line 50, delete "wherein the".
In Claim 18, Column 22, Line 8, delete the first instance of "one".
In Claim 19, Column 22, Line 13, between "based" and "whether" insert --on--.
In Claim 24, Column 22, Line 54, delete the first instance of "one".
In Claim 25, Column 22, Line 59, between "based" and "whether" insert --on--.
In Claim 27, Column 23, Line 15, replace "a" with --the--.

Signed and Sealed this
Twenty-first Day of October, 2014

Michelle K. Lee
*Deputy Director of the United States Patent and Trademark Office*